US007294058B1

(12) United States Patent
Slomiany et al.

(10) Patent No.: US 7,294,058 B1
(45) Date of Patent: Nov. 13, 2007

(54) COMPUTERIZED GAME WITH CASCADING STRATEGY AND FULL INFORMATION

(75) Inventors: Scott D. Slomiany, Streamwood, IL (US); Lawrence E. DeMar, Winnetka, IL (US); Duncan F. Brown, Grayslake, IL (US)

(73) Assignee: Case Venture Management LLC, Wheeling, IL (US)

( * ) Notice: Subject to any disclaimer, the term of this patent is extended or adjusted under 35 U.S.C. 154(b) by 0 days.

(21) Appl. No.: 09/539,286

(22) Filed: Mar. 30, 2000

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................................... 463/31; 463/43

(58) Field of Classification Search ............ 463/16–20, 463/9–14; 273/138.1, 237, 260, 143 R, 243; 434/128–129
See application file for complete search history.

(56) References Cited

U.S. PATENT DOCUMENTS

| | | | | |
|---|---|---|---|---|
| 3,628,259 | A * | 12/1971 | Kahn | 35/8 |
| 3,836,152 | A | 9/1974 | Tintorri | |
| 3,999,760 | A * | 12/1976 | Wilson | 273/133 |
| 4,129,304 | A * | 12/1978 | Mager | 273/243 |
| 4,156,976 | A * | 6/1979 | Mikun | 35/8 |

(Continued)

FOREIGN PATENT DOCUMENTS

DE 3113670 A1 12/1982

(Continued)

OTHER PUBLICATIONS

AR Griffiths, M Radford and M Heard, Java Chess Tutor, 1997, www.octopull.demon.co.uk.*

(Continued)

*Primary Examiner*—Robert E. Pezzuto
*Assistant Examiner*—Omkar A. Deodhar
(74) *Attorney, Agent, or Firm*—McDonnell Boehnen Hulbert & Berghoff LLP

(57) ABSTRACT

A gaming machine and method for operating the same has gameplay elements provided in a manner that can be visualized, with the gameplay elements having a specific nature which is revealed to the player at a beginning to the game. That is, the player knows the value, or ranking, or position, etc., of the gameplay elements upon inception of the game. In a base level for the game of the gaming machine, no unknown gameplay element or random event is injected into the gameplay elements. This is a full information format for the gaming machine and method, and success is measured by the player's ability to manipulate the gameplay elements presented. A gaming machine and a method for operating the same is also provided with the gameplay elements once again having a specific nature which is known to the player at a start to game play, and in a preferred embodiment not subject thereafter to a random or unknown event, with the gameplay elements being arranged in one of a variety of different arrangements presenting a plurality of choices to a player for subsequent play of the elements. Outcome of the game is dependent upon the choices made by the player, with a given choice potentially influencing the next choice that may be available. Embodiments of the invention in the form of a checkers game and in the form of a poker-type game are disclosed, among others.

24 Claims, 24 Drawing Sheets

U.S. PATENT DOCUMENTS

| | | | | | |
|---|---|---|---|---|---|
| 5,011,159 | A | * | 4/1991 | Fortunato et al. | 273/260 |
| 5,019,973 | A | | 5/1991 | Wilcox et al. | |
| 5,224,706 | A | * | 7/1993 | Bridgeman et al. | 273/85 |
| 5,294,120 | A | * | 3/1994 | Schultz | 273/85 |
| 5,294,128 | A | * | 3/1994 | Marquez | 273/292 |
| 5,393,061 | A | | 2/1995 | Manship et al. | |
| 5,401,023 | A | * | 3/1995 | Wood | 273/85 |
| 5,511,781 | A | * | 4/1996 | Wood et al. | 273/85 |
| 5,584,486 | A | * | 12/1996 | Franklin | 273/292 |
| 5,678,001 | A | * | 10/1997 | Nagel et al. | 395/273 |
| 5,711,715 | A | * | 1/1998 | Ringo et al. | 463/9 |
| 5,779,239 | A | * | 7/1998 | Lind | 273/260 |
| 5,779,549 | A | | 7/1998 | Walker et al. | 463/42 |
| 5,791,987 | A | * | 8/1998 | Chen et al. | 463/9 |
| 5,868,619 | A | * | 2/1999 | Wood et al. | 463/13 |
| 5,882,258 | A | * | 3/1999 | Kelly et al. | 463/11 |
| 5,999,808 | A | | 12/1999 | LaDue | 455/412 |
| 6,007,424 | A | * | 12/1999 | Evers et al. | 463/13 |
| 6,012,720 | A | * | 1/2000 | Webb | 273/292 |
| 6,012,981 | A | * | 1/2000 | Fujioka et al. | 463/11 |
| 6,033,307 | A | | 3/2000 | Vancura | 463/20 |
| 6,059,289 | A | * | 5/2000 | Vancura | 273/143 R |
| 6,126,541 | A | * | 10/2000 | Fuchs | 463/13 |
| 6,149,521 | A | * | 11/2000 | Sanduski | 463/13 |
| 6,196,547 | B1 | * | 3/2001 | Pascal et al. | 273/292 |

FOREIGN PATENT DOCUMENTS

| | | | | |
|---|---|---|---|---|
| GB | 2248403 | A | * | 8/1992 |
| GB | 2333968 | A | * | 11/1999 |
| WO | 9960498 | | | 11/1999 |

OTHER PUBLICATIONS

John Scarne, Scarne's Encyclopedia of Card Games, Harper &Row, Publishers Inc. (1983), pp. 404-413.*
Card/brochure: Las Vegas Hilton, Fortune, Pai Gow Poker.
Supplemental European Search Report from related application No. EPO1964669.4, dated Jul. 26, 2006.
Communication from European Patent Office regarding related application No. EPO1964669.4, dated Dec. 5, 2006.

* cited by examiner

FIGURE 7

| BLACK CHECKERS JUMPED | |
|---|---|
| 1 CHECKER | 1 |
| 2 CHECKERS | 2 |
| 3 CHECKERS | 5 |
| 4 CHECKERS | 8 |
| 5 CHECKERS | 10 |
| 6 CHECKERS | 25 |
| 7 CHECKERS | 275 |

FIGURE 8

| BLACK CHECKERS JUMPED | |
|---|---|
| 1 CHECKER | 2 |
| 2 CHECKERS | 3 |
| 3 CHECKERS | 5 |
| 4 CHECKERS | 6 |
| 5 CHECKERS | 10 |
| 6 CHECKERS | 40 |
| 7 CHECKERS | 200 |
| 8 CHECKERS | 300 |

FIGURE 9

| BLACK CHECKERS JUMPED | |
|---|---|
| 1 CHECKER | 2 |
| 2 CHECKERS | 3 |
| 3 CHECKERS | 5 |
| 4 CHECKERS | 6 |
| 5 CHECKERS | 10 |
| 6 CHECKERS | 150 |
| 7 CHECKERS | 400 |
| 8 CHECKERS | 500 |

FIGURE 10

| BLACK CHECKERS JUMPED | |
|---|---|
| 1 CHECKER | -- |
| 2 CHECKERS | 2 |
| 3 CHECKERS | 3 |
| 4 CHECKERS | 10 |
| 5 CHECKERS | 15 |
| 6 CHECKERS | 30 |
| 7 CHECKERS | 40 |
| 8 CHECKERS | 50 |
| 9 CHECKERS | 100 |
| 10 CHECKERS | 125 |
| 11 CHECKERS | 250 |
| 12 CHECKERS | 2500 |

GOLDBONUSCHECKERS

GOLD BONUS CHECKERS

| CHECKERS JUMPED | NUMBER OF RED CHECKERS BET 1 | 2 | 3 | 4 | 5 | BONUS GAME MULTIPLIER |
|---|---|---|---|---|---|---|
| 1 CHECKER | -- | -- | -- | -- | -- | 1X |
| 2 CHECKERS | 2 | 2 | 3 | 2 | -- | 1X |
| 3 CHECKERS | 5 | 5 | 5 | 4 | 2 | 1X |
| 4 CHECKERS | 12 | 12 | 14 | 5 | 7 | 2X |
| 5 CHECKERS | 25 | 25 | 30 | 15 | 10 | 3X |
| 6 CHECKERS | 75 | 70 | 100 | 25 | 15 | 4X |
| 7 CHECKERS | 300 | 200 | 200 | 50 | 25 | 5X |
| 8 CHECKERS | -- | 300 | 400 | 75 | 40 | 6X |
| 9 CHECKERS | -- | -- | -- | 100 | 100 | 7X |
| 10 CHECKERS | -- | -- | -- | 200 | 300 | 10X |
| 11 CHECKERS | -- | -- | -- | 400 | 1000 | 15X |
| 12 CHECKERS | -- | -- | -- | 1000 | 7000 | 25X |

EXIT COINS PER CHECKER 1 COIN BET PER CHECKER

48"

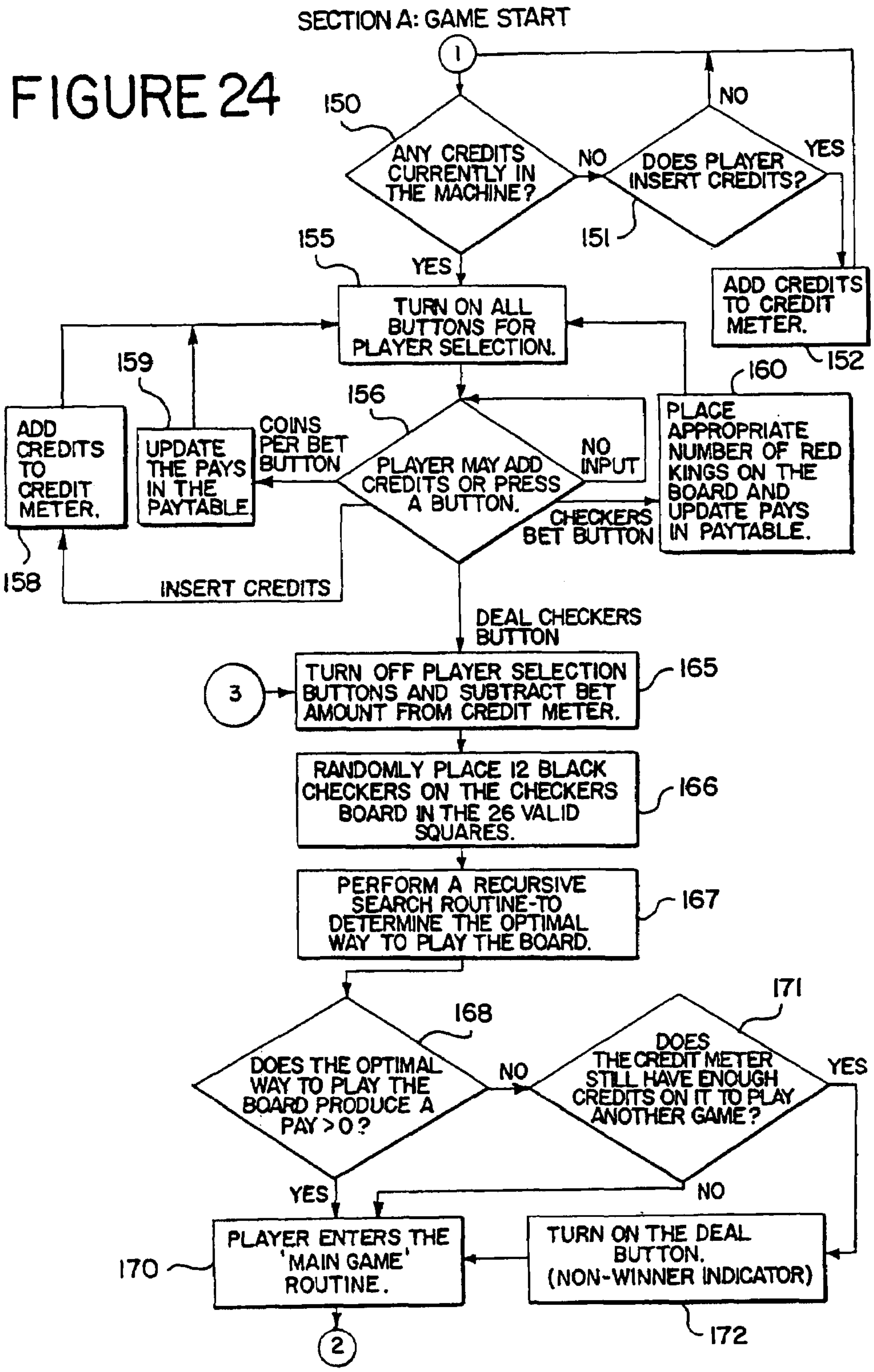
SECTION A: GAME START
FIGURE 24
1
150
ANY CREDITS CURRENTLY IN THE MACHINE?
NO
DOES PLAYER INSERT CREDITS?
NO
YES
151
ADD CREDITS TO CREDIT METER.
152
155
YES
TURN ON ALL BUTTONS FOR PLAYER SELECTION.
159
156
160
ADD CREDITS TO CREDIT METER.
UPDATE THE PAYS IN THE PAYTABLE
COINS PER BET BUTTON
PLAYER MAY ADD CREDITS OR PRESS A BUTTON.
NO INPUT
CHECKERS BET BUTTON
PLACE APPROPRIATE NUMBER OF RED KINGS ON THE BOARD AND UPDATE PAYS IN PAYTABLE.
158
INSERT CREDITS
DEAL CHECKERS BUTTON
3
TURN OFF PLAYER SELECTION BUTTONS AND SUBTRACT BET AMOUNT FROM CREDIT METER.
165
RANDOMLY PLACE 12 BLACK CHECKERS ON THE CHECKERS BOARD IN THE 26 VALID SQUARES.
166
PERFORM A RECURSIVE SEARCH ROUTINE-TO DETERMINE THE OPTIMAL WAY TO PLAY THE BOARD.
167
168
171
DOES THE OPTIMAL WAY TO PLAY THE BOARD PRODUCE A PAY > 0 ?
NO
DOES THE CREDIT METER STILL HAVE ENOUGH CREDITS ON IT TO PLAY ANOTHER GAME?
YES
YES
NO
PLAYER ENTERS THE 'MAIN GAME' ROUTINE.
170
TURN ON THE DEAL BUTTON. (NON-WINNER INDICATOR)
172
2

SECTION B: MAIN GAME ROUTINE

SECTION B: MAIN GAME ROUTINE

SECTION D: BONUS GAME

SECTION C: END GAME ROUTINE

SECTION A: GAME START

SECTION B: MAIN GAME ROUTINE

SECTION A: GAME START

SECTION B: CREATE HANDS

SECTION C: GAME OVER

COMPUTERIZED GAME WITH CASCADING STRATEGY AND FULL INFORMATION

FIELD OF THE INVENTION

This invention generally deals with games of chance, both for amusement on devices such as a home (personal) computer or home game console, hand held game players (either dedicated or generic, such as Game Boy®), coin-operated amusement devices or gaming machines such as for wagering in a casino slot machine-type format.

BACKGROUND OF THE INVENTION

Games of chance can be thought of as coming in three basic varieties. Games in which there are no player decisions, and the result is essentially entirely random; games where the player makes decisions to the extent that the player chooses among different types of wagers; and games where the player makes decisions that affect the outcome of the game.

An example of the first type of game is a standard three-reel spinning slot machine. The player makes a wager, but provides no other input. The results of the game are shown to the player in the form of indicia on the reels, and the player receives an award in the case of a winning result. This type of game can be found, for example, in machines that spin mechanical reels or that simulate the reels on a video display, which have been adapted for casino or other gambling environments, as well as on a home computer or game console.

The second type of game of chance noted above provides different ways to place bets, or different types of bets on a single game. Each type of bet carries its own set of rules, and its own payoff schedule and odds of winning. Some bets may provide better expected return than others, but other than deciding which bet to make on a particular game (which may affect expected return), the decisions made by the player in this second type of game again have no effect on the result of winning or losing. There are many examples of this second type of game of chance, as for instance, gaming machines and casino table games including craps, roulette, keno and Baccarat, all of which may be played with live dealers in a casino, on a slot machine or on a home computer or game console.

The third variety of games of chance considered herein involves decisions that are made by the player that have a direct impact on the result of the game. Games of this nature include BlackJack, Pai Gow Poker, Caribbean Stud Poker, Let it Ride and Video Poker, among others. In each of these games, the player receives an initial hand and then makes one or more decisions about how to proceed in the game. The player's decision-making in these games has a causal effect on the outcome. Specifically, the player may wish to try to make these decisions using the best odds from tables and strategies known to the player, or may play a hunch about streaks being observed, or make a decision under some influence or factor (e.g., fear of jeopardizing a large bet, or to take advantage of the history of the table, such as is done by a "card counting" blackjack player). Of course, a "decision" could also be an unintended mistake, causing a worse expected result. This third type of game is thus to be contrasted to the first and second types where the player's decisions do not affect the winning or losing outcome of the game.

In this third variety of game, the designer of the game will typically do a mathematical analysis of all possible starting hands (using a card game format for example), and all possible outcomes after each possible decision. For any combination of game rules and pay schedule, there is an optimal payout percentage that is computed. This optimal payout percentage is the percentage of a given wager that would be returned to a player that made the optimal decision on every hand over the long run. In the case of a game of chance used for gambling, this optimal payout percentage could be thought of as the worst-case payout percentage for the casino. That is, the percentage of wagers that will be returned to the very best players over the long run. The concept of optimal payout percentage is governed by the laws of probability and statistics, and is well known by those familiar with the art.

Most games of chance that are used for casino wagering have an optimal payout percentage set at less than 100%. This percentage is returned to the player and the balance (between the optimal percentage and 100%, sometimes called the "house edge") is retained by the casino as a profit.

In real life, most games will pay back less than their optimal percentage. This occurs because players often make non-optimal decisions when playing. There are many reasons for players to make non-optimal decisions, such as the game is one for which the player does not understand the optimum strategy, or mistakes and oversights are made by the player, including making non-optimum moves for other reasons such as hunches or superstitions. In the long run, this non-optimal play will result in a greater profit for the casino beyond the house edge.

Because of the highly competitive nature of casino gambling, this greater profit has allowed casinos to offer games with a very high optimal return percentage, knowing that, through mistakes and other non-optimal play, they will receive a better profit than the mathematical house edge. Specifically, it is common to find Blackjack (also known as "21") games with optimal returns of over 98%, and video poker games with optimal returns over 99%. For example, it is well known that a "Jacks or Better" video draw poker with a "9-6" paytable has a return of about 99.54%. (Note that a 9-6 paytable refers to a full house payout of 9 for 1 and a flush payout of 6 for 1.) Most "Jacks or Better" draw poker games have the same paytable at all values except Flush and Full House, and these values are modified to adjust the optimal payout percentage. Table A shows a 9-6 Jacks or Better Paytable for a 1 coin wager.

TABLE A

| | |
|---|---|
| Royal Flush | 800 |
| Straight Flush | 50 |
| Four of a Kind | 25 |
| Full House | 9 |
| Flush | 6 |
| Straight | 4 |
| Three of a Kind | 3 |
| Two Pair | 2 |
| Pair of Jacks or Better | 1 |

Competition can be so strong in certain areas for certain customers that it is not uncommon to find machines that offer optimal payouts of over 100%, with the knowledge that these machines will still be profitable as a result of non-optimal play. Well-known examples of this are "Full Pay Deuces Wild" and 9-7 or 10-6 "Jacks or Better" video poker. The paytable for a Full Pay Deuces Wild which has an optimal payout of about 100.76% is shown in Table B.

TABLE B

| | |
|---|---|
| Royal Flush | 800 |
| Four Deuces | 200 |
| Royal Flush w/deuces | 25 |
| Five of a Kind | 15 |
| Straight Flush | 9 |
| Four of a Kind | 5 |
| Full House | 3 |
| Flush | 2 |
| Straight | 2 |
| Three of a Kind | 1 |

As a result of advertising and word of mouth between players, it is well known that there are casino games that offer an opportunity to play the games with little or no house advantage, if they learn to play the optimum strategy. This is a very attractive proposition for certain players, because there are additional benefits offered to the prospect of breaking even while playing the game. Casinos have "slot clubs" which are akin to "frequent flyer" programs, but for slot machine players. The casino monitors play through the use of a "player tracking card," and typically returns between 0.5 and 3% of the player's play in the form of cash back and "comps". Comps can be anything of value, and are typically discounted or free rooms in the hotel, discounted or free food and entertainment. Additionally, there is the attraction of free drinks at many casinos, and the ambiance, excitement and general entertainment provided by playing games of chance in a casino environment. These benefits provided to attract gamblers, combined with optimal play returns of over 99%, often make the labor of learning optimum play a worthwhile endeavor for many players.

There have been many books written, and lately computer simulations written, that teach players optimum strategy. The computer simulations, among other features allow you to play the game as if you were in a casino, and alert the player that a non-optimum choice was made. In addition, the simulations may provide other features, such as tracking the overall quality of play, and showing the player the accuracy and/or expected loss as a result of a move or a mistake made (if any). The purpose of such a simulation is to learn through repetition and memorization which decisions to make for which types of hands in the game.

It should be noted that in all of these games where the player makes decisions, the optimal strategy is one based on the expected value of one or more random events. That is, the best choice is the one that over the long run is expected to produce the best results. Because there is information about the random event(s) that is unknown at the time of a given decision, there will be times that a different choice would generate a better result. For instance, where optimum Blackjack strategy dictates hitting a 16 when the dealer shows 7 or higher, if the "hit" is a 10 and the dealer's hole card was a 5, then in that particular case the player could have won the hand by standing (in which case the dealer would have "busted"). That information—the hole card as well as the player's next card (the top card on the deck)—was unknown to the player at the time a decision was to be made.

SUMMARY OF THE INVENTION

It is a principal objective of the present invention to provide a new type of computer-based game, and in particular, a new type of game for a wagering (betting) application. This objective is accomplished in one aspect of the invention, where the invention comprises an innovative wagering game in which all information about the game is available to the player at the start, before the first move is made. This type of game is considered to be very attractive to a player because, with "full information" available at the start of the game, optimal play is no longer a matter of practicing and memorizing play strategies based on expected outcomes. Instead, optimal play involves examination of the initial state of the game, and then a determination of which sequence of plays is considered to result in the highest return. This means that a player that understands the mechanics (or rules) of the game can achieve optimum play without memorizing any "moves" or tables that are based on expected results of play. The best outcome can be determined by the player looking at what is displayed, and is not a function of decisions related to or affected by some random event or events.

Yet another aspect of the present invention comprises a game involving decisions by the player in what the inventors herein have termed "cascading strategy". The cascading strategy game of this invention shows the player an initial situation. This initial situation may provide zero or more options, or moves, that the player can make. After the first move (if there is one available) is made, there again may be zero or more options or moves available thereafter. Each time a choice is made by the player, it may affect what subsequent choices become available. This means that any time there are two or more different moves available, the choice may affect which other moves may be made, and thus the results of the game. At the same time, the fact that one move may affect many future moves makes it harder for a player to optimally execute every game. Thus, games made in accordance with the invention may still be competitively run at a very high optimal payout percentage, while still retaining a reasonable profit for the operator (in a wagering setting) due to mistakes that are invariably made by players.

Of course, a full information game may include cascading strategy, and a cascading strategy game may also encompass an arrangement where all of the information of the game is not known at the start of the game. This latter type of game combines the features of cascading strategy with normal expected value analysis on the elements of the game that are not known when each decision is made, i.e., there is some random event or events associated with the game combined with branching choices. This hybrid type of game provides some of the advantages of each type of game.

Therefore, the present invention in one form comprises a gaming machine and method for operating a gaming machine wherein gameplay elements are provided in a manner that can be visualized, with the gameplay elements having a specific nature which is revealed to the player at a beginning to the game. That is, the player knows the value, ranking, position, etc., of the gameplay elements upon inception of the game. There is, at least in a base level for the game, no unknown gameplay element or random event which will be injected into the gameplay elements after the game begins. This is the innovative "full information" format previously discussed.

Continuing with the foregoing embodiment, a mechanism is provided for inputting or registering a wager placed by the player. This could be a coin (or bill) insert, credit card reader, virtual wagering input, or some other similar means for registering a given wager. A mechanism enabling the player to manipulate the gameplay elements toward a game outcome is provided, such as a pointing device or the like noted above.

In one version of this embodiment, manipulation is by rearranging at least one of the gameplay elements relative to another gameplay element, such as for a checkers game. The gameplay elements in this embodiment include a first set of game checkers and a second set of at least one player checkers, generated for instance on a video display. The game checkers are placed on a checkerboard presentation in a generally random manner at the game beginning, with the player thereafter manipulating the one or more player checkers. The number of player checkers depends on a wagering selection in a preferred embodiment. In this preferred embodiment, player checkers have a capture jump movement relative to the game checkers. In a particularly preferred form, the computerized checkers game further provides a visual indication of any available move(s). A count of any such game checkers captured is made, producing a count result as a sum displayed on a visual display. The gaming machine so contemplated in this embodiment includes a program having a pre-determined payout tabulation, with the payout value generated from the payout table based upon the count result.

In another version of the foregoing embodiment, manipulation is accomplished by rearranging cards dealt in a card game. The gameplay elements include a subset of cards which are randomly selected from a larger set of cards, with the display of the subset of cards on a video display. The player manipulates the subset of cards according to a predetermined protocol of card game rules, such as in a poker-type game wherein the cards are of standard suit and rank (although perhaps further including Jokers, etc.). As used herein, "standard suit and rank" is generally meant to refer to ordinary playing cards made up of spades, diamonds, hearts and clubs, and numbering 2 through 10 with the usual Royal Family cards and Ace.

The card game of this particular version further comprises establishing an array for a first and a second hand for the subset of cards to be displayed. The player manipulates the subset of cards into first and second hands in the array. These first and second hands will have a hierarchical value according to a predetermined protocol based upon various combinations of suit and rank, e.g., Flush, Straight, 3 of a Kind, etc. This gaming machine and method further preferably includes a program having predetermined payout tables for each of the first and second hands, each payout table being based at least in part upon the foregoing hierarchical value. In a most preferred embodiment, the first hand is comprised of five cards and the second hand is comprised of three cards, although hands of five and five, four and two, etc., can be envisioned. Two different payout tables are used, with the payout table associated with the second hand acting as a multiplier for values of the first hand, as established by the payout table for the first hand. The wagering aspect of this game includes a selection of one or both paytables by the player.

As variously noted herein, the present invention has found application particularly in a betting environment such as a casino. It is also suited to operate in coin-operated (or other) amusement machines in taverns or the like, where there is an input mechanism which registers a wager placed by a player, which would be a "virtual wager" situation. The gaming machine has a mechanism for the player to manipulate the gameplay elements under control of the player toward a game outcome. The program calculates an output based upon the wager and the game outcome. Of course, the invention is not limited to just such a gaming machine where wagering occurs, as also variously noted herein.

A base game was previously discussed, wherein the outcome is determined solely by the wager and the final arrangement, or outcome. That is, the player has all of the gameplay elements revealed before him or her, and plays the base game without any random event or other unknown factor entering the game, such as a previously undisclosed card in a "dealer's hand," another random draw, etc. This is not to exclude, however, the possibility of there being a random event/unknown factor also included in a game made in accordance with the present invention. The gaming machine may also advantageously include, for instance, a game comprised of a base game having a base game outcome and a bonus round having a bonus round outcome. The base game and bonus round outcomes would be combined for a total game outcome. While the base game outcome is determined by the final arrangement, with no random gameplay element involved in the base game, the bonus round may include such a random event.

For example, in a checkers game made in accordance with this bonus round aspect of the invention, a base game has gameplay elements including a first set of game checkers and a second set of at least one player checkers. The program places the game checkers on a checkerboard displayed on a visual display in a generally random manner at the beginning of the game, and the player manipulates the player checker(s) with a player input mechanism interfacing with the cpu responsive to player commands. In a casino-type environment, the input mechanism includes a wagering device responsive to player wagering input. An output is based upon (in the base game) a wagering input and movement of the player checker(s), as by a capture jump move. In this embodiment, the computerized checkers game further includes the bonus round. For instance, the bonus round may be earned by a capture jump movement of a special game checker (such as a gold checker) which appears during some base game rounds, with a random interval between rounds that contain the special game checker. It could be earned in other manners, of course, such as jumping a checker having a hidden special indicium, or by virtue of an amassed score, or by a certain number of amassed moves, etc.

One such embodiment of a bonus round has the computer program generate the bonus round by providing a set of bonus checkers each having either a value indicia or an "end-round" indicium. The value and end-round indicia are initially hidden from the player. The player selects at least one bonus checker, revealing the indicium of the bonus checker selected. Value indicia revealed are compiled (e.g., by adding or multiplying credits or the like), and the bonus round continues with another set of bonus checkers until an end-round indicium may be revealed. If no end-round indicium is revealed after a predetermined number of bonus checker selections, a final bonus event occurs wherein a plurality of final bonus checkers are displayed, and are then randomly removed until a single final bonus checker remains. The single final bonus checker has a value, which is then compiled.

Meeting another principal objective of the present invention relating to cascading strategy, a gaming machine and a method for operating the same has a programmed cpu and a display for displaying a game to a player. Gameplay elements are visualized on the display, with the gameplay elements having a specific nature which is known to the player at a start to game play, and is not subject thereafter to random variation in that nature throughout the game. In a casino-type of other betting environment, provision is made for an input for a wager placed by the player.

Once again, a mechanism is provided enabling the player to manipulate the gameplay elements toward a game outcome. The gameplay elements are, however, arranged on the display in one of a variety of different arrangements, with at least some of the arrangements presenting a plurality of choices to a player for subsequent play of the elements. A given arrangement may present one or more choices, and selection of a given choice may impact further choices thereafter presented.

In one form of the foregoing embodiment, the game again is a game of checkers, and the gameplay elements comprise a set of computer-generated game checkers and at least one computer-generated player checker(s). Operation of the method and apparatus in this checkers embodiment is as already described above. The cascading strategy aspect is presented by selection of one of a plurality of jump moves, with that selection then potentially impacting a next available move or moves.

In another variation of the foregoing embodiment, the game takes the form of a game of cards, this time a game such as "Crazy Eights." The gameplay elements include a subset of cards which are randomly selected from a larger set of cards. The cards are displayed in this subset, and manipulated according to a predetermined protocol of card game rules, such as the well-known "Crazy Eights" rules. Here again, selection of a particular card to play in a given sequence may thereafter affect a next available play or plays, thereby resulting in potentially different game outcomes, as in the foregoing checkers version.

The present invention in another aspect provides a gaming apparatus and method for operating a gaming machine with an indication provided to the player as to whether there is a way to win (e.g., recoup some or better the wager made) the particular arrangement of gameplay elements presented at any given time. In this aspect of the invention, gameplay elements are provided in a manner that can be visualized, with the gameplay elements again having a known nature which is revealed to the player at a beginning to the game. A mechanism enabling the player to manipulate the gameplay elements toward a game outcome is employed. A tabulation of predetermined values based upon manipulation of the gameplay elements (e.g., a payout table) is included in the programming, along with a predetermined threshold value constituting a minimum winning game, i.e., what it takes in checkers jumped or in a card hand, for two exemplary instances, to achieve an award of credits.

The gameplay elements are arranged in a randomized manner in a preset array for a play arrangement (such as the checkers game board presentation described above, or the poker game also described above). The program then determines the optimum manner to manipulate that play arrangement (e.g., checker board, card hand), and whether the optimum manner of play meets the threshold value. An indication to the player as to whether the optimum manner meets the threshold value is then provided, such as via a sound (a "ding", for example) and/or a visual indication (a lighted button, for another instance). The indication could be that there is no way to win, so the player then can immediately move on to the next board/hand, or alternatively that there is a way to win available.

Yet another aspect of the invention takes the form of a computer game and method for operating a processor-controlled game where an instructional or teaching feature is available. Once again, an embodiment of the foregoing has visualized gameplay elements having a specific nature which is revealed to the player at a beginning to the game, with player manipulation of the gameplay elements toward a game outcome being enabled. The gameplay elements are arranged in a randomized manner in a preset array for a play arrangement.

An optimum manner to manipulate the particular play arrangement presented is determined by the computer program. The player plays the game (e.g., checker board or card hand described above), and the game outcome achieved by the player for that arrangement is registered. That player game outcome is then evaluated against the optimum manner, and an indication to the player as to whether the optimum manner was achieved by the player is indicated. This could be simply an indication (e.g., message) that the player did not achieve the optimum, or may include displaying the optimum manner to manipulate the play arrangement. Moreover, a replay step enabling the player to replay at least one preceding manipulation of the play arrangement may advantageously be provided.

These and other objectives and advantages achieved by the invention will be further understood upon consideration of the following detailed description of embodiments of the invention taken in conjunction with the drawings, in which:

BRIEF DESCRIPTION OF THE DRAWINGS

FIGS. 7 through 10 show various paytable iterations;

FIGS. 24 and 25 are diagrammatic flowcharts of a Checkers game program made in accordance with the present invention;

DETAILED DESCRIPTION OF EMBODIMENTS OF THE INVENTION

Figure 1:
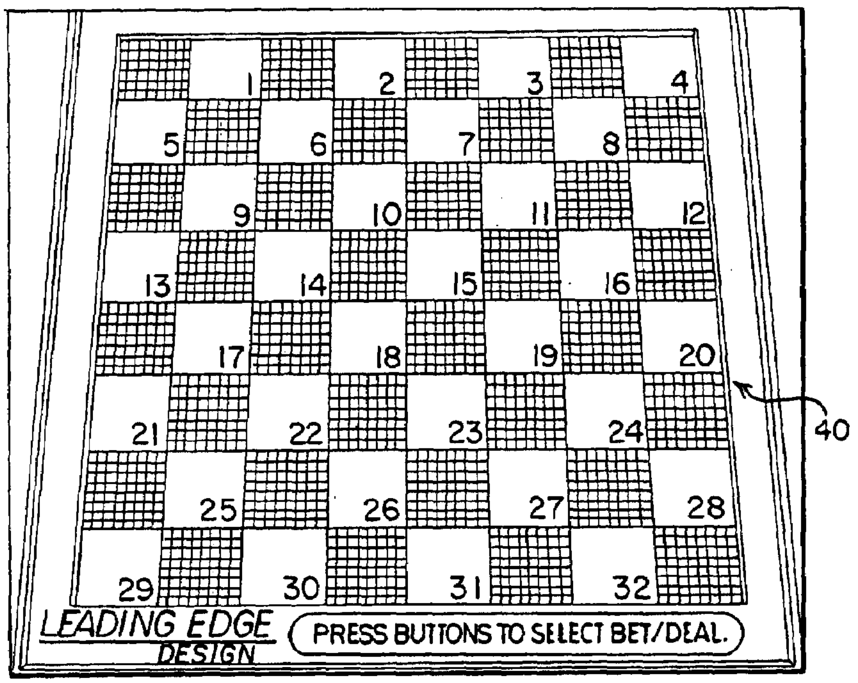
FIG. 1 is a perspective view of a game display of a checkerboard.

One embodiment of a game of chance made in accordance with the present invention, to which both cascading strategy and full information available at the start of the game have been applied, is a simulation of a variation of the game of Checkers. Traditional Checkers is played on a checkerboard 40 that consists of thirty-two red squares and thirty-two black squares. Both red and black checkers are played on the red squares. Referring to FIG. 1, the red (or lighter) squares have been numbered 1-32.

Figure 2:
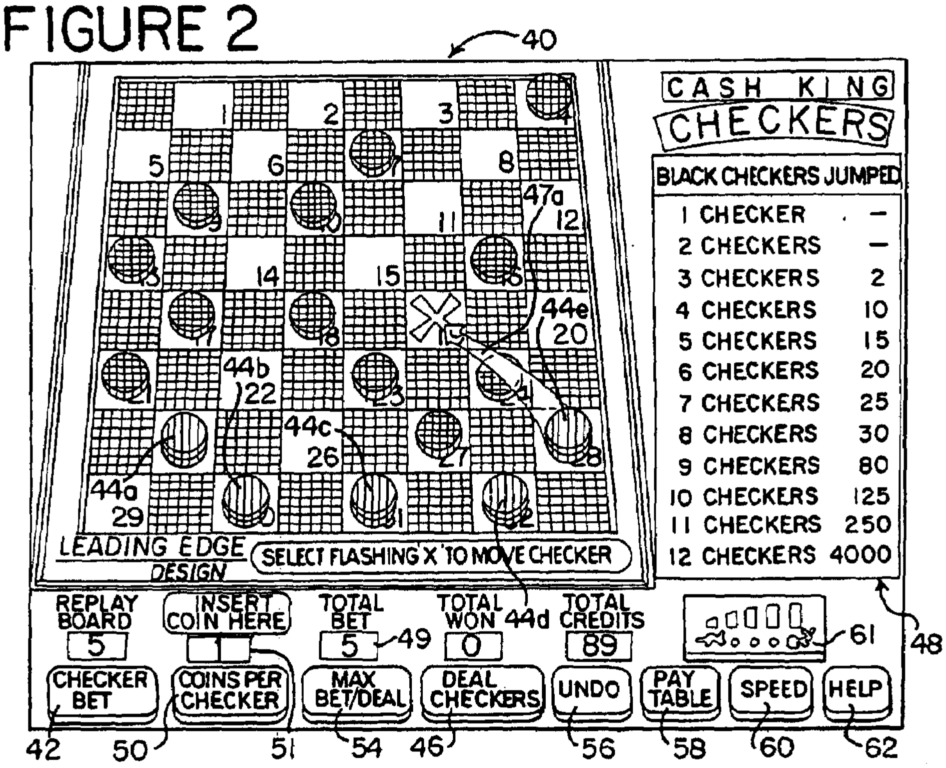
FIG. 2 is a view similar to that of FIG. 1, showing checkers and other indicia on a game display.

Referring to FIG. 2, the player begins the game by making a bet of one to five units (units wagered may be credits or coins, for instance, as is well known in the art). The player presses a "Checker Bet" button 42 from 1 to 5 times to indicate the wager. For each unit wagered, a red "King" checker 44*a* through 44*e* will be placed on the board as follows:

| Amount wagered | Red Kings placed in squares |
|---|---|
| 1 credit | #31 |
| 2 credits | #31, #32 |
| 3 credits | #30, #31, #32 |
| 4 credits | #28, #30, #31, #32 |
| 5 credits | #25, #28, #30, #31, #32 |

Square #29 does not receive a checker at the start of a game in this embodiment. It will be noted that while this embodiment of a game places the red King checkers according to a fixed sequence and location, a randomized placing arrangement could be employed. That would entail significant effort in calculating corresponding paytables, however, as those with skill in the art will appreciate.

In the illustrated first embodiment, one coin is wagered per checker. It is, of course, well known to those skilled in the art to increase the wager to multiple units per checker. Once the player has specified the bet on the red King(s), he/she presses the "Deal Checkers" button 46. All of the buttons and other indicia referenced herein are generated as well as operated using computer programs well-known in the art, such as Macromedia Director (ver. 7). Of course, the buttons could also be mechanical buttons that are moved (as by depressing) by the player.

Using a random number generator as is also well known in the art, the game CPU (program) randomly places twelve black checkers in the remaining twenty-six red squares (i.e., the red squares that don't include starting red King positions #25, #28, #30, #31, #32 and unused starting square #29). It is well known that randomly placing twelve checkers in twenty-six squares is described by the function sometimes called "26 choose 12," which results in one of 9,657,700 unique combinations computed by:

$$\frac{26!}{(12! * 14!)}$$

Each of the 9,657,700 combinations has equal probability (1/9,657,700) of being selected. The CPU displays the game board showing the red Kings that were placed through the player's wager, and the twelve black checkers that were randomly selected. The display may be on a computer display device such as a CRT, liquid crystal display or other electronic display. It could likewise be a three-dimensional display device, such as a mechanical game board, with a mechanism for registering the placement and movement of pieces thereon, for instance.

After the CPU displays the initial setup or "hand", the player commences to play out the hand. Unlike ordinary checkers, in this embodiment the player may only make moves that result in the "jumping" and capture of a black checker. Also unlike ordinary checkers, the player (playing the red Kings) continues to make moves until unable to jump a black checker, at which point the game is over. A jumping move is made in the same manner as ordinary checkers, i.e., the player's red King may jump a black checker on a diagonally adjacent square if the square that is diagonally beyond the adjacent black checker is unoccupied. For example (and referring to FIG. 1), if there is a red King in square #30, a black checker in square #26 and square #23 is vacant, then the red King in square #30 may "jump" the black checker in square #26, removing the black checker from the board, resulting in the red King in square #23, and squares #26 and #30 being vacant. If square #23 was occupied by either a red King or a black checker, then the red King in square #30 could not "jump" the black checker in square #26.

To commence play of the game after showing the initial "hand", the program identifies all possible jump moves that the player may legally make, and displays a board that shows the position of all of the checkers and a representation of all of the possible legal moves. In the illustrated embodiment of FIG. 2, the CPU shows each possible legal move as a diagonal arrow 47*a* over the black checker that could be captured (along the diagonal path of the jump), with a blinking "X" in the open square #19 where the red King could jump to. Of course, it is conceived that certain embodiments would not display any available move(s).

Unlike other games with player input which have a random event following the input, it may be determined after the "deal" (in this embodiment, the checkerboard setup) that the player will lose (win zero credits) no matter how the board is played (e.g., if the player cannot capture three or more black checkers when five red Kings are being played, given the paytable 48 shown in FIG. 2). Another novel feature of this invention is to provide an indicator to the player that there is no need to analyze the hand for play, because there is no way to play the hand that will result in a credit award. One way to do this is to light (and activate) the "Deal Checkers" button 46 at this time, cueing the player to proceed to deal the next hand without making any (futile) moves on the current hand. Another way to do this is to provide a positive signal on hands that should be played, such as a bell sound ("ding") to indicate that the hand just dealt should be played, because there is the prospect for some award. A combination of both the lit button and the bell ding will also work well. By allowing the player to instantly know that there is no way to play the hand to win, it eliminates some player fatigue and frustration, while causing the player to play more hands per hour, which is beneficial to the operator (in a casino setting).

In FIG. 2, it is clear that there is only 1 move available: the red King 44*e* on square #28 is able to jump to square #19 by jumping the black checker on square #24. Once this move is made, this red King 44*e*, now on square #19, has two possible moves (arrows 47*c*, 47*d* in FIG. 3). In addition, and as a result of the removal of the black checker from square #24, the red King 44*c* on square #31 is now able to jump over the black checker on square #27 and land on square #24

Figure 4:
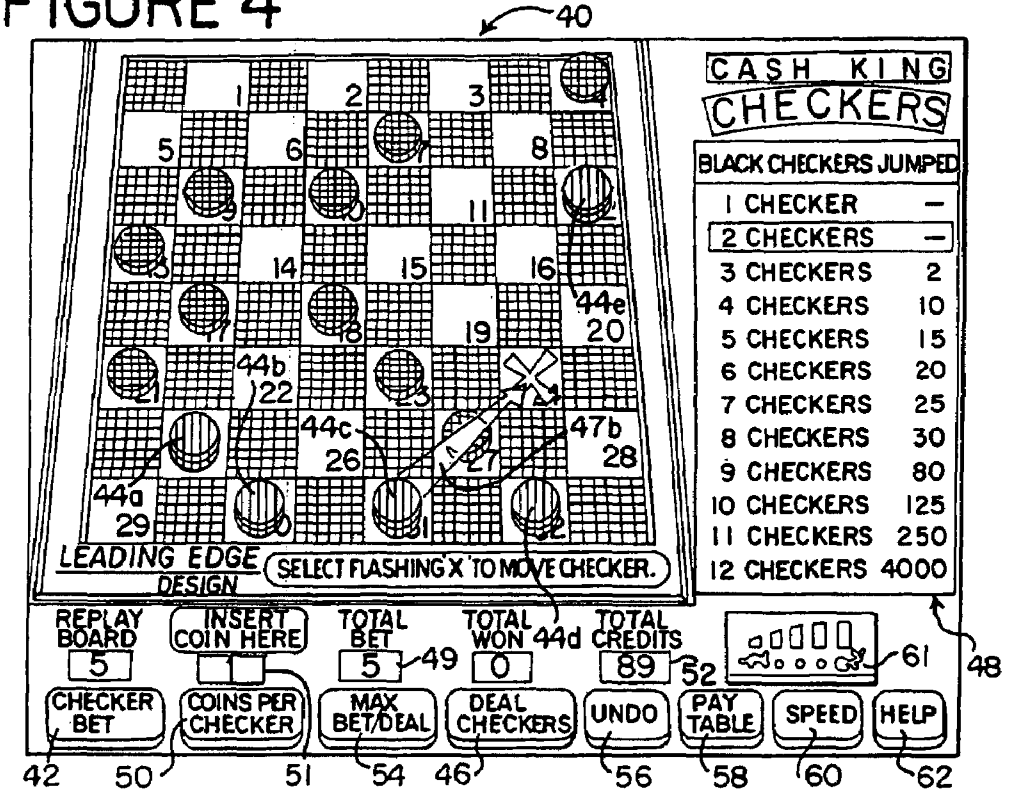

(arrow 47*b*). If the player were to choose to move red King 44*e* from square #19 to square #12 (jumping the black checker on square #16, arrow 47*c*), it would result in FIG. 4.

The player's only option (in FIG. 4) is to move red King 44*c* from square #31 to square #24, jumping over the black checker on square #27 (arrow 47*b*). This move ends the game, since there are no allowable moves after this one. The player has removed three checkers, however, which results in a two coin win (note paytable 48, the construction of which will be explained in further detail hereafter).

Figure 3:
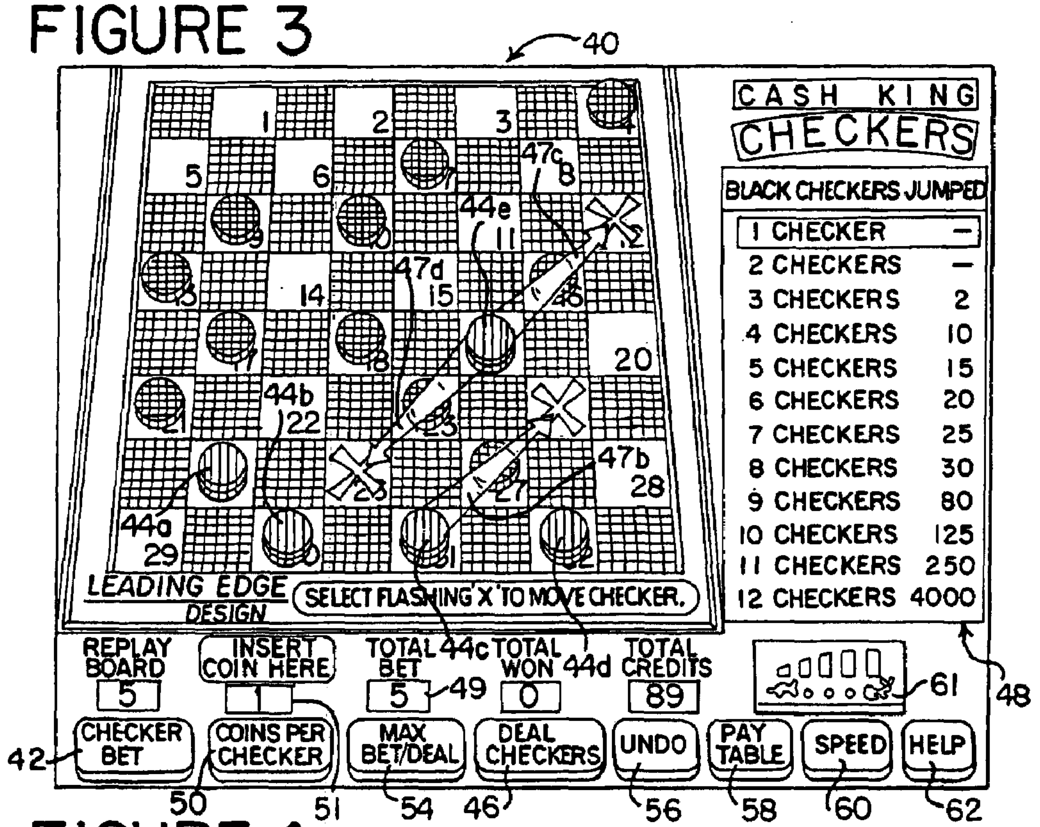
FIGS. 3 through 6 are views similar to that of FIG. 2 showing various checker placements.
Figure 5:
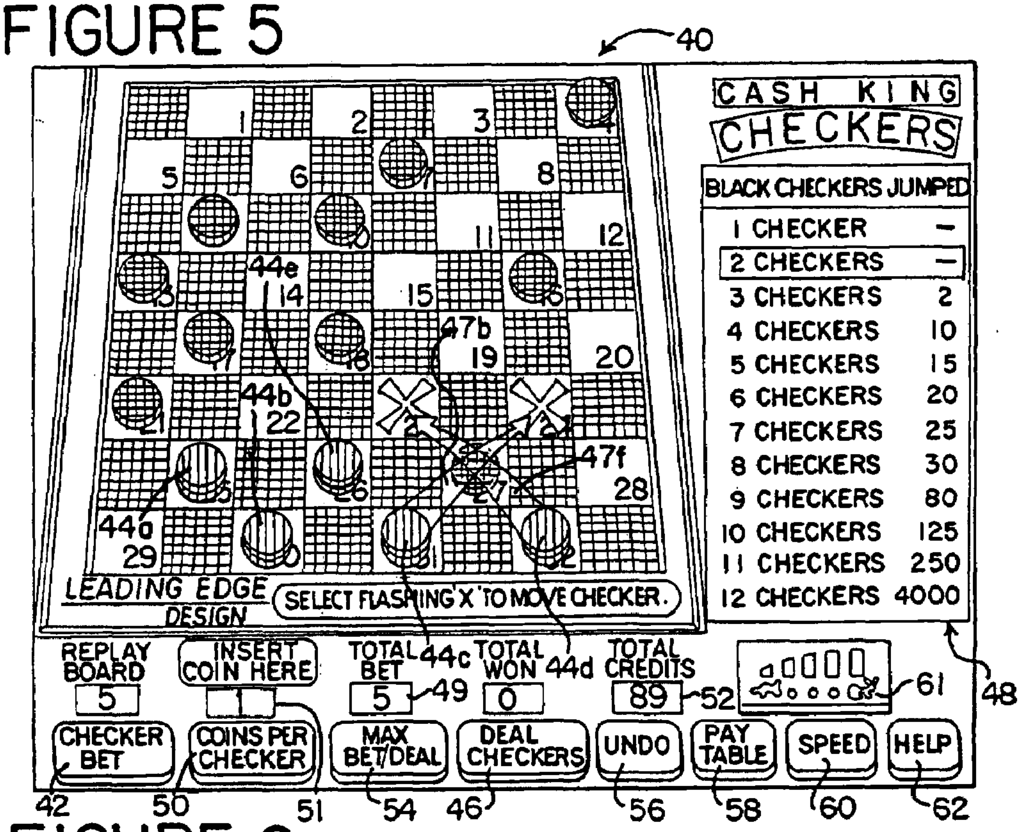

Looking again at FIG. 3, if the player were to instead move red King 44*e* from square #19 to square #26 by jumping the black checker on square #23 (arrow 47*d*), then the resulting situation is shown in FIG. 5. Now there are two possible moves. The red King 44*c* on square #31 can move to square #24 by jumping the black checker on square #27 (arrow 47*b*). This would end the game with a total of three black checkers jumped.

The other and more preferable move is for the player to move red King 44*d* from square #32 to square #23 by jumping the black checker on square #27 (arrow 47*f*). Once this move is made, the only remaining move is to use this same King 44*d* to jump to square #14 over the black checker on square #18, then to square #5 over the black checker on square #9. This ends the game with a total of five black checkers taken, as shown in FIG. 6.

Figure 6:
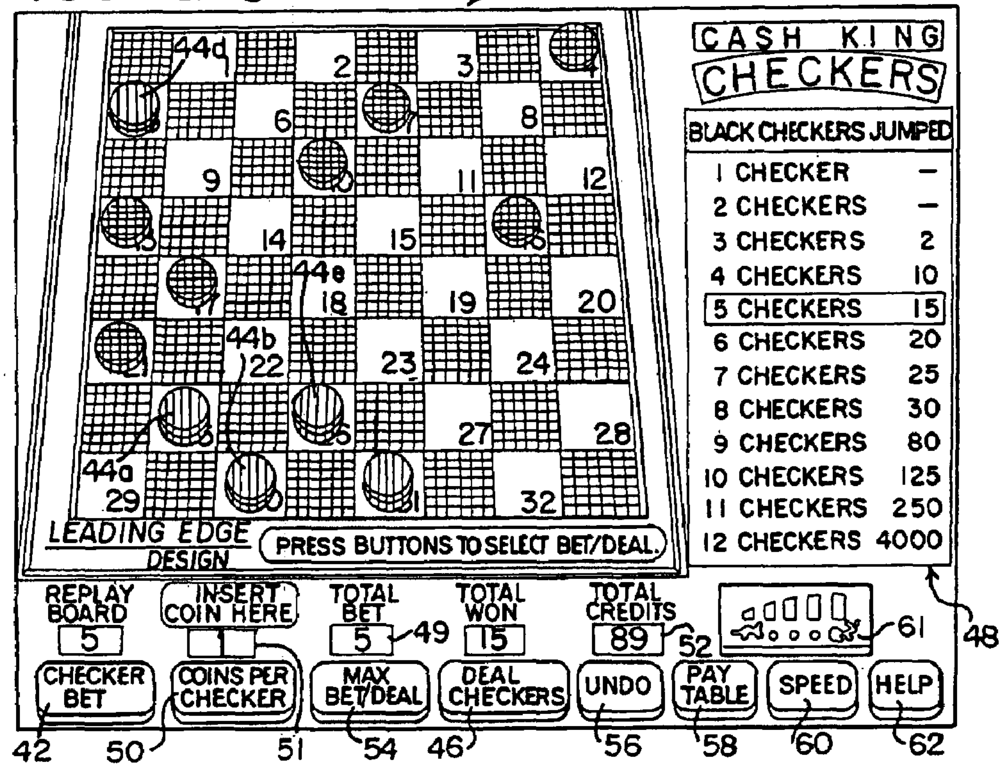

The optimal play for this board thus results in five checkers being jumped and a win of fifteen coins (paytable 48, FIG. 6). There were also two different ways to play the board that resulted in only three checkers being jumped. Through examination of the board and knowledge of the game of Checkers, a player would be able to determine the optimal play without memorizing any combinations or expected values, as would be necessary for other games of chance that require decisions by the player.

The game so far described displays a paytable 48 (e.g., FIG. 5) that indicates the number of credits, coins or the like, that will be returned to the player jumping the indicated number of black checkers. The paytable for five red Kings is shown on the right side of FIGS. 2 through 6. The corresponding paytables for one, two, three and four red Kings are shown in FIGS. 7 through 10, respectively.

The paytables herein were constructed through an analysis of the game. This analysis was done separately for each starting combination of red Kings (numbering in quantity one through a total of five). The following analysis is for four red Kings, but the process can be repeated for the other starting setups.

Regardless of the number of red Kings being played by the player, the CPU will always place twelve black checkers randomly in the 26 squares (1-24, 26, 27). As explained earlier, this results in one of a unique 9,657,700 combinations selected with equal probability. As is well known in the art, one can determine the probability of each line on the paytable by using a computer to examine each of the 9,657,700 combinations, and then determine the optimal result for each combination.

Referring to Table C hereafter, the column labeled "Occurrences" is created by exhaustively iterating over the 9,657,700 possible starting boards and determining the optimal play for each board. Optimal play for a board is determined by exhaustively trying each sequence of possible jumps for that board (as was done manually in the foregoing Checkers example above), and recording the highest number of black checkers removed. For each of the 9,657,700 possible boards, a unit is added to the row that indicates the most black checkers that could be jumped for that board. The probability column shows the probability of a game resulting in that number of black checkers being removed. This is computed by dividing the number of occurrences for that line by the total number of combinations (9,657,700). As is well known in the art, the sum of all possible probability values will always total 1.0.

The EV/Coin bet column (Table C) shows the percentage of one coin that (on average in the long run) will be returned by each paytable line. "EV" is expected value. This EV/Coin bet is calculated by multiplying the probability by the paytable value, and then dividing by the number of coins played. This is computed in this case of a game with four red Kings by:

$$\frac{\text{probability} * \text{Paytable Value}}{4}$$

The expected value for the paytable line is an indication as to what part of the return percentage comes from that class of pay. The overall return for the game is shown at the bottom of this column, by taking the sum of the EV/Coin for each line in the table. As shown in Table C, this is 0.946208 or a 94.6208% return. If the game is to remain based on random probability of the checker combinations (as opposed to a weighted algorithm), then the way to modify the payout percentage is to change the paytable values.

It is well known in the art that in Video Poker machines which use a standard deck of playing cards, one can infer the payout percentage from the paytable. This also applies to this Checkers simulation, where the black checkers are placed randomly. By changing the payout for three checkers jumped from three (Table C) to four (Table D), the result is a game that now returns 98.9025%.

It should be clear that this game may be designed with more or less black checkers, and more or less red Kings. So too, checkers that only jump forward (instead of Kings which can move in any direction), different placement of the red Kings, and/or using weighted probability for the placement (i.e., some combinations of checkers are more likely than others), can be employed in the practice of the invention, just to name a few modifications. Higher or lower payout percentages (including over 100% return) can plainly also be generated without departing from the invention. Besides being particularly suitable for a wagering environment, such as a casino setting, the invention also contemplates software versions of this game for a coin operated amusement game or personal computers and home game consoles, including a version that a player would use to develop familiarity with the game (a teaching version), to have the confidence to risk money in a gaming environment. Such a program may include detection of non-optimal play, and a tally of the cost (in coins, credits and/or percentage) of these mistakes. Value (credits) or achievement may also be assessed by the number of moves made rather than only jumping (in the checkers-type game). The game may also be established to provide a certain number of moves no matter what, for another instance. The possibilities are myriad.

TABLE C

| Checkers Jumped | Occurrences | Probability | Paytable Value | EV/Coin Bet |
|---|---|---|---|---|
| 0 | 2612424 | 0.27050167 | 0 | 0.000000 |
| 1 | 2144938 | 0.22209615 | 0 | 0.000000 |

TABLE C-continued

| Checkers Jumped | Occurrences | Probability | Paytable Value | EV/Coin Bet |
|---|---|---|---|---|
| 2 | 1580792 | 0.16368204 | 2 | 0.081841 |
| 3 | 1654040 | 0.17126645 | 3 | 0.128450 |
| 4 | 829441 | 0.08588391 | 10 | 0.214710 |
| 5 | 459132 | 0.04754051 | 15 | 0.178277 |
| 6 | 254404 | 0.02634209 | 30 | 0.197566 |
| 7 | 88860 | 0.00920095 | 40 | 0.092009 |
| 8 | 26801 | 0.00277509 | 50 | 0.034689 |
| 9 | 5935 | 0.00061454 | 100 | 0.015363 |
| 10 | 881 | 9.1223E−05 | 125 | 0.002851 |
| 11 | 50 | 5.1772E−06 | 250 | 0.000324 |
| 12 | 2 | 2.0709E−07 | 2500 | 0.000129 |
| Total | 9657700 | 1.0000 | | .946208 |

TABLE D

| Checkers Jumped | Occurrences | Probability | Paytable Value | EV/Coin Bet |
|---|---|---|---|---|
| 0 | 2612424 | 0.27050167 | 0 | 0.000000 |
| 1 | 2144938 | 0.22209615 | 0 | 0.000000 |
| 2 | 1580792 | 0.16368204 | 2 | 0.081841 |
| 3 | 1654040 | 0.17126645 | 4 | 0.171266 |
| 4 | 829441 | 0.08588391 | 10 | 0.214710 |
| 5 | 459132 | 0.04754051 | 15 | 0.178277 |
| 6 | 254404 | 0.02634209 | 30 | 0.197566 |
| 7 | 88860 | 0.00920095 | 40 | 0.092009 |
| 8 | 26801 | 0.00277509 | 50 | 0.034689 |
| 9 | 5935 | 0.00061454 | 100 | 0.015363 |
| 10 | 881 | 9.1223E−05 | 125 | 0.002851 |
| 11 | 50 | 5.1772E−06 | 250 | 0.000324 |
| 12 | 2 | 2.0709E−07 | 2500 | 0.000129 |
| Total | 9657700 | 1.0000 | | 0.989025 |

Figures 11, 12:
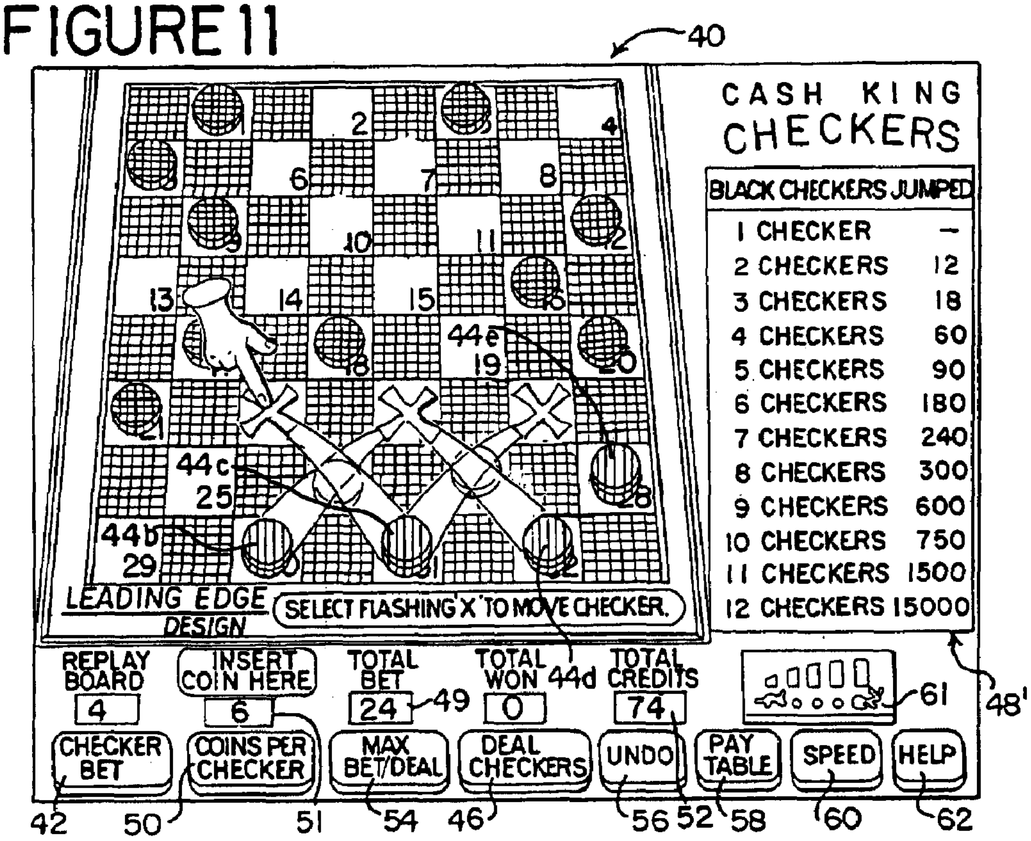
FIG. 11 is a view similar to that of FIG. 2.
FIG. 12 shows a tabular paytable display in accordance with a bonus game.

Referring to FIG. 11, some of the adaptations made for use in a casino environment are further shown. The "Checker Bet" button 42 is used to indicate how many checkers to play, and therefore how many coins or credits to wager on the game. This is cycled from "1" to "5" then back to "1" for each press of the button. The number selected is shown visually above the button 42. The number of red Kings placed on the board 40 will follow this Checker Bet value. This button 42 is only active before the start of a new game.

The "Coins per Checker" button 50 allows a multiplication of the bet, and the payout, by a number from "1" to "10". This is cycled from "1" to "10", then back to "1" for each press of the button. The range of this multiplier can be modified, as desired. FIG. 11 shows this multiplier (at 51) set to "6", resulting in a total bet of twenty-four coins or credits (six times the four unit bet for playing four red Kings), displayed at 49. The paytable 48' (prime numbers are used herein to relate similar but modified elements) is modified by this multiplier; thus the paytable shown in FIG. 11 in the right column displays the values shown in Table C multiplied by 6. The selected multiplier value is displayed over the "Coins per Checker" button 50. This button 50 is likewise only active before the start of a new game. It should be noted that the "Checker Bet" button 42 and "Coins per Checker" button 50 will only be active if there are credits on the machine. When there are credits on the machine, these buttons will only allow combinations of bet and multiplier that fall at or under the current number of credits, here displayed at 52.

The "Deal Checkers" button 46 is used to begin a game. It will start a new game with the number of red Kings specified. The product of red Kings and multiplier (shown in the "Total Bet" meter 49) will be deducted from the "Total Credits" meter 52. While this implementation shows that credits are established by putting money into the machine and then playing the credits using these buttons, there are other well-known implementations that cause the coins to be put into play as they are inserted, for another instance.

The "Max Bet Deal" button 54 is a "one button solution" that sets up the maximum bet available based on how many total credits there are in the machine for the game (up to five checkers with up to 10X coins per checker), and begins play of a new game. Assuming sufficient credits on the machine, it is the same as pressing the "Checker Bet" button 42 until the checker count reaches "5", then the "Coins per Checker" button 50 until the multiplier is 10X, then the "Deal Checkers" button 46. This Max Bet Deal button 54 is only active before the start of a new game.

Once the player has been dealt an initial combination of checkers, or "hand" as it is being used herein, the game proceeds with the player selecting which jumping moves should be made, assuming at least one is available. There are several ways to do this, and a given implementation or interface may support one or more means to specify how the moves are to be executed. If the game has a touchscreen monitor for instance, the player may simply touch one of the squares showing a flashing "X" (e.g., see FIG. 11) to indicate which move to make. In the case of FIG. 11, if the player touches square #23, then the CPU may cause the red King checkers on squares #30 and #32 (44*b*, 44*d*) to flash, and instruct the player to indicate which of these two checkers to move to square #23. The player would then touch the square containing the checker to move. If the machine has a mouse, joystick, trackball or other pointing device, then this device may be used to indicate which "X" (and in the case of square #23, which checker) to select.

In addition to a touchscreen or other pointing device, the player may use pushbuttons (either real mechanical pushbuttons or virtual buttons on a video screen, like those shown in FIG. 11). Pushbuttons are often preferred by some players, to allow play without moving a hand and arm around to use a pointing method. Although any pushbutton scheme may be employed, it is preferred that three buttons are used. The first two buttons would select "next move" and "last move," respectively. These buttons (not shown in this embodiment) allow the player to select which move out of all available moves is "selected". The selected move (square with an "X") may be shown by an icon of a hand for instance (shown pointing to square #22 in FIG. 11) or any other method of calling out a specific square, such as changing its color or drawing a highlight box around the square. The two buttons allow the player to advance forward or backward through the available moves. In FIG. 11, the "next move" button would cycle from square #22 to square #23 to square #24 then back to square #22. The "last move" button would cycle from square #24 to square #23 to square #22 then back to square #24.

The third button noted in this variation would be a "make move" button (again not shown), which would cause the selected move to be made. The same process would be used to cycle between different checkers, such as the checkers on square #30 and square #32, when a move destination could be reached by more than one checker, such as when square #23 is selected in FIG. 11.

There is an "undo" button 56 which allows the player to undo the last move made. This is provided to give the player the chance to fix a mistake made by imprecise pointing or a miscalibrated pointing device, for example. The undo button 56 may have more significance for the gaming devices and methods of the invention in contrast to others, because of one move having a potentially large effect on the outcome. The undo button 56 becomes active each time a move is made, and is deactivated once it is used. This allows the last move to be undone but not moves before it.

The "Paytable" button 58 displays the paytables 48, 48' for the different coin and multiplier combinations available. This button is active at all times.

The "Speed" button 60 controls the speed of dealing the checkers at the start of the game, and may also be used to influence the speed at which animated jump moves are made and/or the rate at which credits won are "racked up" into the credit display. A small meter 61 above this button indicates the currently selected speed. This button 60 may be active at all times.

The "Help" button 62 provides instructions of the rules of the game and how it is played. This button 62 is active at all times.

Not shown is a "Cash Out" button, which would dispense coins, bills or a payment receipt to the player for the number of credits on the display when this game is used for wagering. Coins or bills may be inserted in standard ways well known in the trade.

It should be understood that the various buttons shown or otherwise described in relation to the foregoing embodiment, and indeed in regard to all embodiments herein, are exemplary. All are not required; others may be used in addition. The type, quantity and nature of these buttons are not intended to limit the invention in any manner.

A modified embodiment of the foregoing checkers game involves the incorporation of a bonus game. It is known in the gaming industry to create games containing different objectives including the opportunity to periodically play a "bonus game". This bonus game may be a separate game, with an expected return greater than the amount wagered (in contrast to the standard game which usually has an expected return of less than the amount wagered, as discussed above). Certain outcomes in the main or "base game" result in the playing of the bonus game, which usually gives the player an opportunity to win many credits, perhaps also amidst an audio-visual presentation that adds excitement to the game.

There are many ways to initiate a bonus game in the checkers simulation described above. For one example, the bonus game could be triggered as a result of capturing a particular number of black checkers. For another, the bonus game may be entered as the result of causing a checker to land in a particular square. A certain number of moves by a single checker might take a player to the bonus game. Again, the choices are myriad, and the architecture for incorporating the same into the game is understood by those of skill in the art.

In the modified embodiment described herein, the bonus game is reached by jumping a "special" checker which appears gold in color. The presentation of the game is the same as described above, with the modification that some of the boards contain a single gold checker. For instance, and referring to the gameboard of FIG. 11, the checker at square #18 (depicted therein as a black checker) when dealt could have been the gold checker. If the player is able to jump the gold checker, then at the end of the game, for instance, the bonus round will commence (although a bonus round could just as well be executed immediately, with a return to the game underway upon conclusion of the bonus round). It should now be evident that in this particular combination of the main checkers game with this bonus game, this results in a hybrid game, where full information for movement is available before the player makes decisions, as well as cascading strategy, yet with some random event(s) in the game that require "expected value" analysis for optimal play—here, the bonus round under consideration, as will be made clearer in discussion of the bonus round hereafter.

Now turning to the exemplary bonus round, after the game ends (i.e., once there are no more moves available on the board), if the player jumped over the special (gold) checker, then the bonus round begins. To add extra excitement and opportunity for the player, a table of bonus round multipliers is shown as a paytable 48", as shown in FIG. 12 (this paytable may be displayed on demand by using button 58 (FIG. 11)). A bonus round multiplier from 1X to 25X is shown, and is based on the total number of checkers jumped in the game that earned the bonus round. For example, if the player jumped a total of four checkers (three black and the gold) to begin the bonus round, then the bonus round would be played with all awards being multiplied by 2X (per the predetermined paytable).

Figure 13:
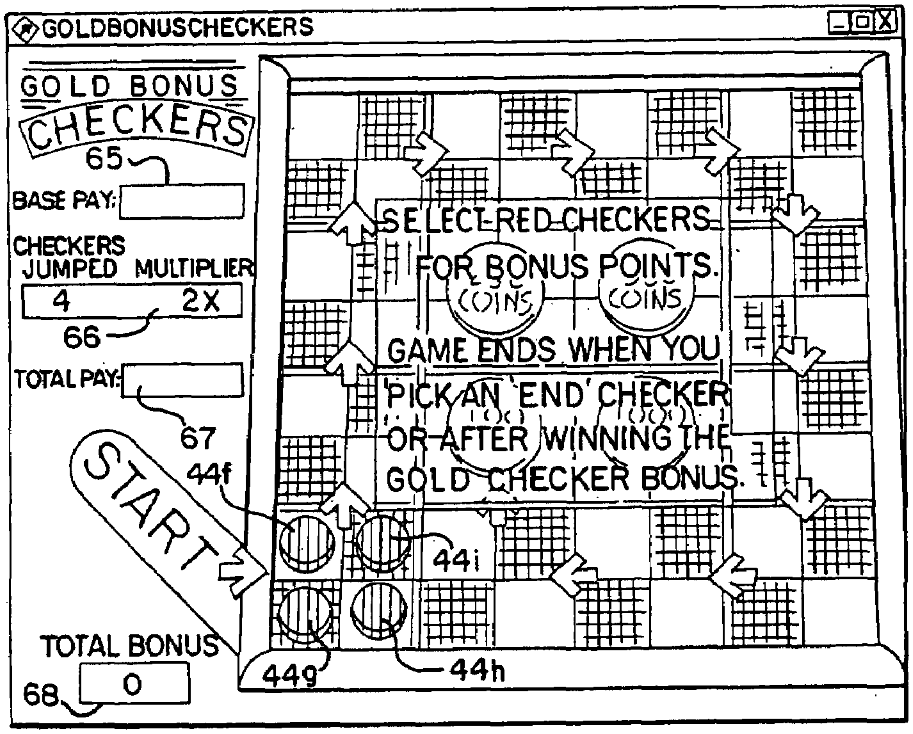
FIGS. 13 through 15 show perspective views at various times of a gameboard display for a bonus game.

Play of the bonus round being described herein begins with the screen shown in FIG. 13. In each step of the bonus round, the player is presented four red checkers 44*f* through 44*i*, each containing a hidden credit (or coin) award or the word "End". The player selects one of the four red checkers 44*f* through 44*i*, which is then flipped over to show its value. If the checker contains a credit award, then that number is copied to the "Base Pay" window 65. It is then multiplied by the multiplier shown in the "multiplier" window 66 resulting in the total pay for that checker in the "Total Pay" window 67. The amount from the "Total Pay" window 67 is then added to the "Total Bonus" window 68 where the entire bonus round total is accumulated. The multiplier is determined from FIG. 12 based on the total number of checkers that were jumped in the main game, including the gold checker.

If the checker reveals the word "End", then the bonus round is over and the player has won the total number of credits shown in the "Total Bonus" window 68. Looking at FIG. 14, it will be seen that the bonus round is played on a conventional 64 square checkerboard 40'. There are, however, twelve sets of four squares arranged in a clockwise path starting from the lower left where it is marked "Start". Each set of four squares may receive between zero and three red checkers marked "End" in this game scenario. Each time the player picks a checker with a credit value, there is an award of that value times the multiplier; and four more red checkers will appear in the next set of squares in this clockwise path.

Figure 14:
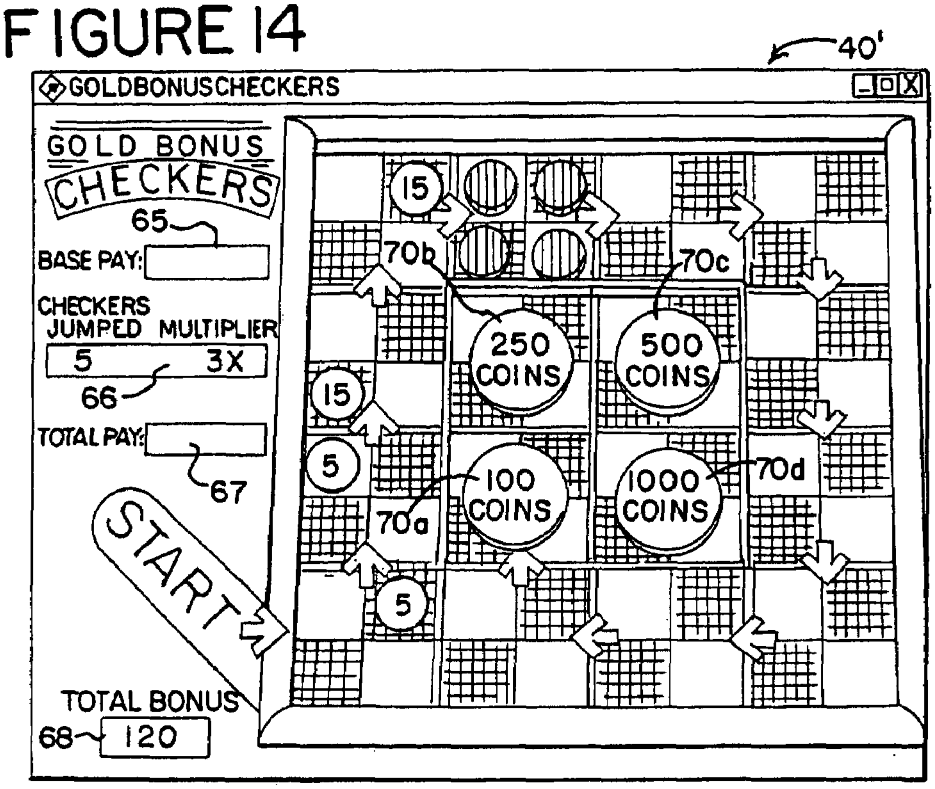
Figure 15:
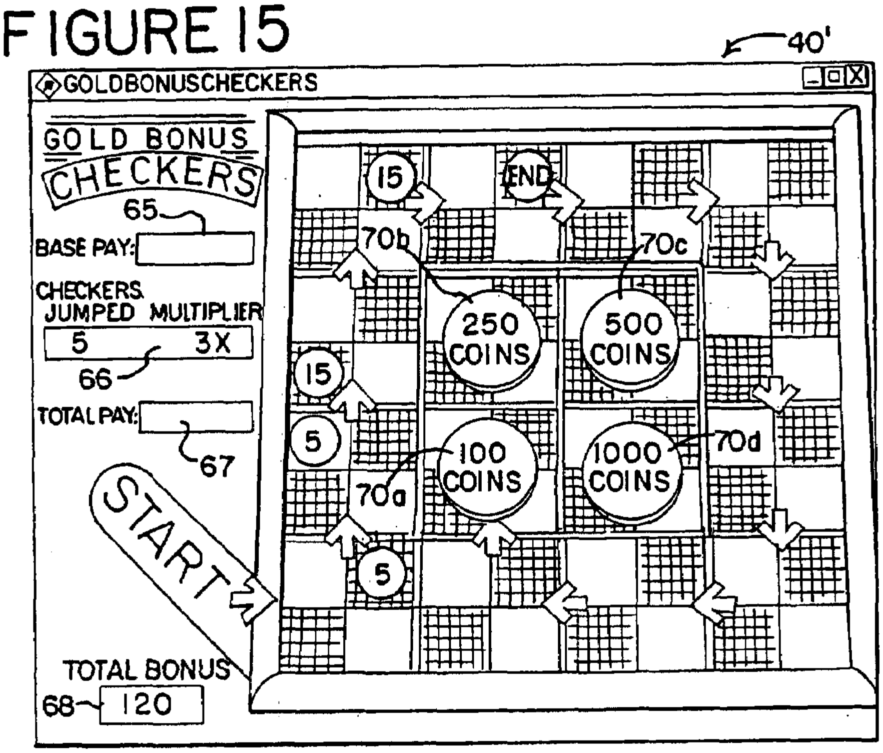

FIG. 14 shows a bonus game after four red checkers have been successively selected (i.e., the player has successfully avoided an "End" laden checker four times). Each time a red checker is selected, it is flipped to show the coin value or "End" on its underside, and in this embodiment the values remain displayed as the player advances around the board 40'. FIG. 15 shows the same bonus game that is ended when "End" is exposed under the red checker that was selected as the fifth selection.

If the player manages to select twelve checkers containing credit values (i.e., not "End"), then in this embodiment the player will qualify for the "Gold Checker Bonus." After the twelfth checker value (times the multiplier) is added to the "Total Bonus" window, the four large gold checkers 70*a* through 70*d* in the center of the board begin to spin, and the player is directed to press a button which will randomly cause three of the four large gold checkers to explode (disappear on the video screen), leaving the final award value on the remaining large gold checker. This value will be multiplied and added to the "Total Bonus" window and the bonus game will be over.

At the end of the Bonus round the number of credits earned in the "Total Bonus" window are then added to the credit meter on the main game display screen, along with the number of credits earned from the regular paytable for the number of black and gold checkers jumped. Again, the manner of effectuating a bonus round is not limited to the foregoing embodiment, which is by way of example of one way to do it, albeit a presently preferred way.

To determine the expected value of the overall game (base game combined with bonus game), a separate analysis for boards where the gold checker appears is done and combined with the analysis for boards that contain only black checkers. For each number of red Kings played, there is a separate set of tables required. The tables for four red Kings played will be shown in the following example.

In this bonus round example, the gold checker is arbitrarily set to appear on the board randomly at an expected rate of frequency of one in twenty-five games. That is, based on a random number selection there is a one in twenty-five chance, or 0.04 probability, that the gold checker will be used in any game board. The following analysis will separately determine the expected return for boards that contain the gold checker, and for boards that contain only black checkers, and then show how these are combined to determine the overall expected return for the game.

Using the techniques described above for the non-bonus-game version, the paytable may be modified to create a lower expected return of 0.8874, as shown in Table E. This paytable is used for games containing only black checkers as well as for the "base game pay" of games that include the special gold checker (i.e., in games that jump the gold checker, the player receives credits from the regular paytable in addition to the credits earned in the bonus game).

TABLE E

| Checkers Jumped | Occurrences | Probability | Paytable Value | EV/Coin |
|---|---|---|---|---|
| 0 | 2612424 | 0.270501672 | 0 | 0 |
| 1 | 2144938 | 0.222096151 | 0 | 0 |
| 2 | 1580792 | 0.163682036 | 2 | 0.08184102 |
| 3 | 1654040 | 0.171266451 | 4 | 0.17126645 |
| 4 | 829441 | 0.085883906 | 5 | 0.10735488 |
| 5 | 459132 | 0.047540512 | 15 | 0.17827692 |
| 6 | 254404 | 0.02634209 | 25 | 0.16463806 |
| 7 | 88860 | 0.009200948 | 50 | 0.11501186 |
| 8 | 26801 | 0.002775091 | 70 | 0.0485641 |
| 9 | 5935 | 0.000614536 | 100 | 0.01536339 |
| 10 | 881 | 9.12225E−05 | 200 | 0.00456113 |
| 11 | 50 | 5.17722E−06 | 400 | 0.00051772 |
| 12 | 2 | 2.07089E−07 | 1000 | 5.1772E−05 |
| | 9657700 | 1 | | 0.8874473 |

Before analyzing the method of determining the expected value when a gold checker is put into play, it is useful to first determine the expected value of the bonus game. There are thirteen possible components of the bonus game consisting of the twelve possible red checkers selected and the gold bonus checker. Each selection has a fixed probability of ending the game (e.g., there may be no "End" checkers on the first or second turn, and there is only one "End" checker on the third turn, etc.).

In Table F, the second column shows the number of "End" checkers established for each "move." The third column shows the probability of not selecting "End" at that move of the bonus game. The fourth column gives the probability of getting past the move indicated in the first column of the given line. It is created from the product of the cell above it (the probability of getting past the previous move) and the cell to the left (the probability of getting past the current move). The fifth column shows the expected value of the credits that will be received on that move if "End" is avoided. The sixth column is the expected value contribution of that move and is created by multiplying the probability of getting through the move (fourth column) times the expected number of credits for avoiding the "End" (fifth column). The sum of the expected values in the sixth column results in a 29.90624 expected value for the bonus round. This does not include any potential multipliers that may have been earned by getting to the bonus round with a high "checkers jumped" count. The gold checker bonus value in the fifth column is derived from Table F2 showing the probability and expected value of the four possible outcomes of the gold checker bonus.

TABLE F1

| Move Number | Number of "End" Checkers | Probability of not selecting "End" | Probability of Bonus game getting this far | Average Value of this move | EV |
|---|---|---|---|---|---|
| 1 | 0 | 1 | 1 | 3.8 | 3.8 |
| 2 | 0 | 1 | 1 | 3.8 | 3.8 |
| 3 | 1 | 0.75 | 0.75 | 8.61538462 | 6.461538 |
| 4 | 1 | 0.75 | 0.5625 | 8.61538462 | 4.846154 |
| 5 | 2 | 0.5 | 0.28125 | 17.5 | 4.921875 |
| 6 | 1 | 0.75 | 0.2109375 | 8.61538462 | 1.817308 |
| 7 | 2 | 0.5 | 0.10546875 | 17.5 | 1.845703 |
| 8 | 2 | 0.5 | 0.052734375 | 17.5 | 0.922852 |
| 9 | 2 | 0.5 | 0.026367188 | 17.5 | 0.461426 |
| 10 | 2 | 0.5 | 0.013183594 | 17.5 | 0.230713 |
| 11 | 3 | 0.25 | 0.003295898 | 23.5714286 | 0.077689 |
| 12 | 2 | 0.5 | 0.001647949 | 17.5 | 0.028839 |
| Gold Checker Bonus | | 1 | 0.001647949 | 420 | 0.692139 |
| | | | | | 29.90624 |

TABLE F2

| Checker Value | Probability | EV |
|---|---|---|
| 100 | .2 | 20 |
| 250 | .4 | 100 |
| 500 | .2 | 100 |
| 1000 | .2 | 200 |
| | | 420 |

For each set of four checkers, it can be seen from Table F how many of them will reveal "End" if selected (in the second column). The number of checkers shown in the second column is selected randomly from the four available choices for that turn to contain "End". The remaining checkers for that turn are given random values from the column of Table G corresponding to the number of End checkers for that turn. The EV row at the bottom of Table G shows the expected value of checker values randomly selected from that column. It is these numbers that are used in the fifth column of Table F showing the "Average value of this move".

TABLE G

| | 0 End Checkers | 1 End Checker | 2 End Checkers | 3 End Checkers |
|---|---|---|---|---|
| | 2 | 5 | 10 | 15 |
| | 3 | 5 | 10 | 15 |
| | 3 | 6 | 15 | 15 |
| | 3 | 7 | 15 | 15 |
| | 4 | 7 | 15 | 20 |
| | 4 | 8 | 15 | 20 |
| | 4 | 9 | 20 | 20 |
| | 5 | 9 | 20 | 20 |
| | 5 | 10 | 25 | 20 |
| | 5 | 10 | 30 | 25 |
| | | 15 | | 25 |
| | | 15 | | 30 |
| | | 15 | | 40 |
| | | 20 | | 50 |
| EV | 3.8 | 10.07143 | 17.5 | 23.57143 |

Now that an expected value of the bonus round (29.90624) has been computed, it is combined with the multiplier table shown in FIG. 12, and the four-coin paytable shown in both FIG. 12 and Table E to create an expected value table based on the number of checkers jumped in the base game.

Table H shows the expected value for a combined game (base game plus bonus game) where the gold checker was jumped and the bonus game was played. Both the base game pay value and the bonus game multiplier are determined by the number of checkers jumped (including the gold checker). The combined expected value of games where the bonus game is played is the base game paytable value plus the Bonus game multiplier times the Bonus game EV (paytable+(Mult*BonusEV)). This value is shown in the sixth column of Table H. Note that in the game with only black checkers, the exact payout for any number of jumps is a known value taken from the paytable. In that game there was no unknown information at the time the player made decisions of which checkers to jump. In the variation when a gold checker is jumped and a bonus round entered, the player's payout is an Expected Value which includes random unknown (to the player) event(s) made in processing the bonus round.

TABLE H

| Checkers captured in base game | Base Game Pay-table | Bonus game Multiplier applied | Bonus game 1X EV | Multiplied Bonus Game EV | Expected Value of Base plus Bonus |
|---|---|---|---|---|---|
| 1 | 0 | 1 | 29.90624 | 29.906235 | 29.90624 |
| 2 | 2 | 1 | 29.90624 | 29.906235 | 31.90624 |
| 3 | 4 | 1 | 29.90624 | 29.906235 | 33.90624 |
| 4 | 5 | 2 | 29.90624 | 59.81247 | 64.81247 |
| 5 | 15 | 3 | 29.90624 | 89.718706 | 104.7187 |
| 6 | 25 | 4 | 29.90624 | 119.62494 | 144.6249 |
| 7 | 50 | 5 | 29.90624 | 149.53118 | 199.5312 |
| 8 | 70 | 6 | 29.90624 | 179.43741 | 249.4374 |
| 9 | 100 | 7 | 29.90624 | 209.34365 | 309.3436 |
| 10 | 200 | 10 | 29.90624 | 299.06235 | 499.0624 |
| 11 | 400 | 15 | 29.90624 | 448.59353 | 848.5935 |
| 12 | 1000 | 25 | 29.90624 | 747.65588 | 1747.656 |

In checker boards that contain a gold checker, since the twelve checkers are placed randomly at the outset of the game, and when the gold checker appears, it randomly replaces one of the black checkers, there are twelve times the number of boards that contain the gold checker as were analyzed when one simply placed twelve black checkers randomly on twenty-six squares (i.e., for each combination of "26 choose 12" ways of placing the black checkers there are twelve places to place the gold checker).

As was done with the "black checker only" boards, each of the possible combinations is analyzed to determine the way to play the board to achieve the highest expected payout. It should be clear that on some boards the gold checker will not be jumpable, and that on other boards the gold checker may be jumpable, but jumping it may not produce the highest expected return. For example, a particular board played one way may result in jumping only the gold checker, while when played a different way a plurality of black checkers could be jumped (choose seven black checkers for this example). It is apparent from Table H that jumping just the gold checker has an expected return of 29.90624, while jumping seven black checkers has a return of 50. Unlike the "black checkers only" game, there is an expected return of a random event that is factored into this type of decision. In the above example, the player will be better off in the long run to jump the seven black checkers for the 50 coin return, than to play the bonus round with an expectation of about 30 coins. However, any given bonus round could deliver over 1000 coins, if the player is very lucky.

Using a computer in the same manner as was done for the "black checker only" game, each board (of 9,657,700*12=115,892,400) is analyzed for the combination of black and/or gold checkers jumped which will provide the highest return. This program will track twenty-five different totals, including zero checkers jumped, one to twelve black checkers jumped without jumping a gold checker, and one to twelve checkers jumped including the gold checker. These occurrences may now be combined with the data from Table H to generate the expected return for games that include a gold checker. This is shown in Table I. Using the identical analysis that was used on Table C, Table I shows that the expected return of a board containing a gold checker is 3.3011 coins. In many games of chance (including the black only checkers game) a simulation is run to generate the occurrences of each possible result which is plugged into a spreadsheet as was done in Table C. The spreadsheet of Table C can be used to modify the payout percentage by changing values in the paytable. This is possible because the program that generated the occurrences would always count the play sequence that generated the most checkers jumped without regard to the paytable. As long as jumping more checkers resulted in the same or greater pay, then this method will work.

The foregoing program that generates the occurrences for the spreadsheet in Table I uses the paytable and bonus game EV's of Table H as part of its input, to compare expected payout for different numbers of black and gold checkers jumped (to select the way to play the board that awards the most credits). The results in Table I are the results for only the paytable and bonus game information that was input (from Table H). To change the payout percentage by modifying the paytable or bonus game requires running the program again to generate a new occurrence table based on a newly created Table H.

TABLE I

| Jumped Black, Gold | Occurrences | Probability | Expected Pay | EV Contribution |
|---|---|---|---|---|
| 0, 0 | 31349088 | 0.270501672 | 0 | 0 |
| 1, 0 | 23443478 | 0.202286587 | 0 | 0 |

TABLE I-continued

| Jumped Black, Gold | Occurrences | Probability | Expected Pay | EV Contribution |
|---|---|---|---|---|
| 2, 0 | 15584336 | 0.134472459 | 2 | 0.067236229 |
| 3, 0 | 14212329 | 0.122633831 | 4 | 0.122633831 |
| 4, 0 | 6267130 | 0.054077144 | 5 | 0.06759643 |
| 5, 0 | 2964775 | 0.025582135 | 15 | 0.095933006 |
| 6, 0 | 1364591 | 0.011774638 | 25 | 0.073591484 |
| 7, 0 | 400967 | 0.003459821 | 50 | 0.043247767 |
| 8, 0 | 95498 | 0.000824023 | 70 | 0.014420402 |
| 9, 0 | 15609 | 0.000134685 | 100 | 0.003367132 |
| 10, 0 | 1624 | 1.4013E−05 | 200 | 0.00070065 |
| 11, 0 | 49 | 4.22806E−07 | 400 | 4.22806E−05 |
| 12, 0 | 0 | 0 | 1000 | 0 |
| 0, 1 | 2416548 | 0.020851652 | 29.9062352 | 0.155898603 |
| 1, 1 | 3556136 | 0.030684808 | 31.9062352 | 0.244759172 |
| 2, 1 | 5644026 | 0.048700571 | 33.9062352 | 0.412813249 |
| 3, 1 | 3578734 | 0.030879799 | 64.8124704 | 0.500349012 |
| 4, 1 | 2472250 | 0.021332288 | 104.718706 | 0.558472384 |
| 5, 1 | 1602370 | 0.01382636 | 144.624941 | 0.49990911 |
| 6, 1 | 640325 | 0.005525168 | 199.531176 | 0.275610826 |
| 7, 1 | 219207 | 0.00189147 | 249.437411 | 0.117950846 |
| 8, 1 | 53908 | 0.000465156 | 309.343646 | 0.035973233 |
| 9, 1 | 8848 | 7.63467E−05 | 499.062352 | 0.009525438 |
| 10, 1 | 550 | 4.74578E−06 | 848.593528 | 0.00100681 |
| 11, 1 | 24 | 2.07089E−07 | 1747.65588 | 9.04799E−05 |
| | 115,892,400 | 1 | | 3.301128375 |

The expected return for the combined game is then computed by combining the expected values of the two types of games (games in which a gold checker appears and games in which the gold checker does not appear). Table J shows the overall expected value of 0.98399 (98.399% return) is the result of combining the expected values of games that contain black checkers only and games that contain the gold checker. Just as was seen in Table C, to determine the expected value of a game, you multiply the expected value of each outcome by the probability of that outcome and add up all of these components. By combining the EV of the black-only boards shown in Table E with the EV of boards that have the gold checker in Table I, a combined game shown in Table J has an expected return of 98.399%.

TABLE J

| | Probability | EV of this Case | Contribution to overall EV |
|---|---|---|---|
| All Black Checkers | 0.96 | 0.887447296 | 0.851949404 |
| Black with 1 Gold | 0.04 | 3.301128375 | 0.132045135 |
| | | | 0.983994539 |

As was previously highlighted, this invention is not in any way limited to a Checkers-type game application, notwithstanding that the inventors consider the foregoing Checkers embodiments to be patentable in and of themselves. Accordingly, in another embodiment, the invention is reflected in a game of chance played with cards, once again played on a computer-controlled display. As with the Checkers version, the card game may be played for amusement, or in coin-operated or wagering machines, such as used for casino gaming in a slot machine-type device.

The game of this card embodiment uses a standard fifty-two card "deck", although one or more jokers could be added, or other modifications could be made to the deck without departing from the invention ("standard card deck" being used herein to refer to the fifty-two card deck plus any jokers, etc., that may be additionally included).

Briefly, the game is set in a poker-type game format, with two different paytables that specify the awards for different poker hands. The player may wager one to five coins on the first paytable, for example, although a set number of coins or more than five coins could be used. The selection of wager amount is not significant to the practice of the invention.

The first paytable specifies coin values for different ranking poker hands. The player may make an additional wager equal to the first wager to thereby gain the use of a second paytable. It is conceived that there will be versions of the game where the wager on the second paytable does not have to equal the wager on the first paytable. Moreover, a single wager could cover both paytables in certain embodiments. Again, the use of two paytables, or indeed any particular paytable, is not a primary aspect of the invention, although the two paytable combination is considered to be novel in this particular application.

In this card embodiment, the second paytable contains a set of multipliers. The second paytable could also use coin values instead of multipliers, or it could be swapped so that the first paytable specified multipliers and the second paytable specified coin values.

Figure 16:
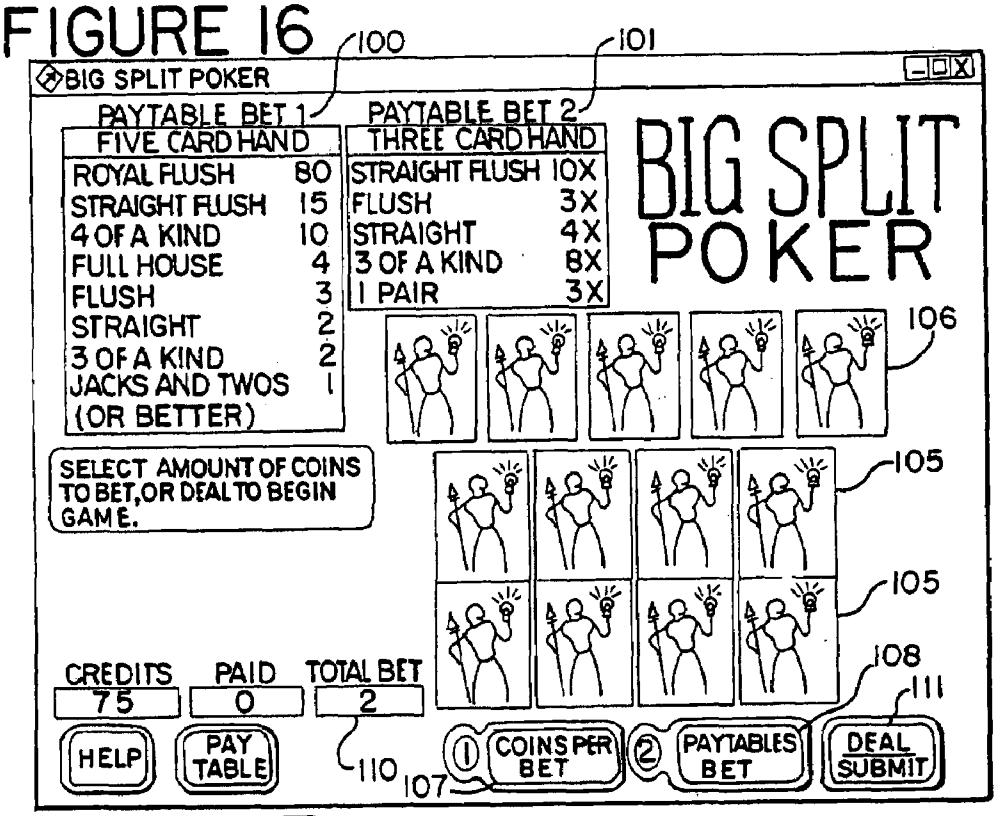
FIG. 16 is a view of a display of another embodiment of the invention in the form of a poker-type game.

Referring to FIG. 16, a game display is shown having paytables 100 and 101, and spaces 105 and 106 for cards to be displayed. The player uses a "Coins Per Bet" button 107 to specify "1" to "5" coins bet on the first paytable 100. The player uses the "Paytables Bet" button 108 to specify either "1" paytable, which indicates that the "Coins Per Bet" amount is being wagered on the first paytable 100 only, or to specify "2" paytables, in which case the player's bet is doubled and both paytables will be used. The total number of coins bet is shown in the "Total Bet" window 110 and is the product of "Coins Per Bet" and "Paytables Bet".

Figure 17:
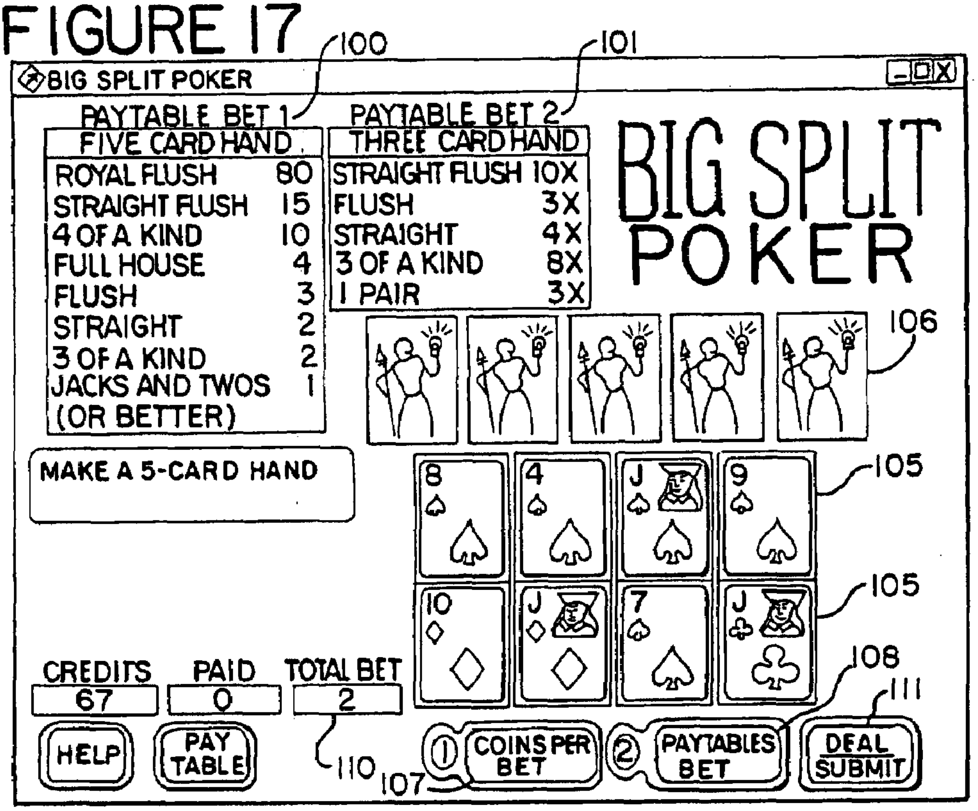
FIGS. 17 and 18 are views similar to that of FIG. 16 showing various card placements.

After the bet has been specified, the player presses the "Deal/Submit Button" 111, at which time the game randomly deals eight cards from a standard fifty-two card deck face up to the player in spaces 105. FIG. 17 shows the game display after a hand has been dealt. The player must now decide how to play the hand. The decisions that the player makes affect the outcome of the hand, and here, as in the Checkers embodiment, there is no random event after the decisions are made. The player has full information on all possible outcomes at the point at which decisions are to be made.

The game of this embodiment is played by the player breaking the eight card hand into two poker hands. The first hand has five cards, while the second hand has the remaining three cards. The first paytable 100 is applied to the five card hand. While different paytables could be constructed without departing from the invention, in the illustrated embodiment the five card hand sets a minimum for a paying hand at two pairs, where one of the pairs must be a pair of Jacks or higher. This minimum pay level for this embodiment was picked to establish a desired "hit rate" (percentage of non-losing hands). Other "hit rates" could readily be selected. The five card hand also gets paid for any hand that is, of course, higher than this (e.g., three of a kind, straight etc.) as shown in FIGS. 16 and 17. If the five card hand is less than two pair with Jacks or higher (denoted here as "Jacks and Twos (or better)" then the hand loses (i.e., zero coins "won"). The game is over.

Digressing briefly as to the second paytable 101, if the player bets on both paytables, then the three card hand may generate a multiplier which will multiply the paytable value awarded to the five card hand. If the three card hand contains a pair or higher, in this embodiment, then the multiplier shown in the "Three Card Hand" paytable 101 is used. If the three card hand is less than one pair, then a multiplier of 1X is used, i.e., there is no improvement of value of the five card hand.

This configuration of paytable coin awards and multipliers means that if at least one combination of five cards does not result in Jacks & Twos or better, then the hand is a losing hand (zero times any multiplier is still zero). This means that the player needs to look at the eight cards and first see if there are one or more ways to play Jacks & Twos or better with five cards. When playing with a single paytable, the player wants to select the five card hand that provides the highest award on the five card paytable. When playing with two paytables, however, the player wants to play the five card/three card combination that results in the highest award after the five card paytable award is multiplied by the three card paytable multiplier. This increases the challenge of the game to the player; it also increases the return to the house in the casino environment, since less than optimum choices may be made by the player for all the reasons previously described, and which can be imagined.

Referring again to the hand dealt in FIG. 17, one can immediately see that there is a five card flush in the suit of spades. To indicate how the hand should be divided, the player indicates (using a mouse, touchscreen, button panel, other pointing or dragging means and the like previously noted), which five cards should be moved to the five card hand. These cards are moved up to the five spaces 106 shown over the eight cards now occupying the spaces 105.

Figure 18:
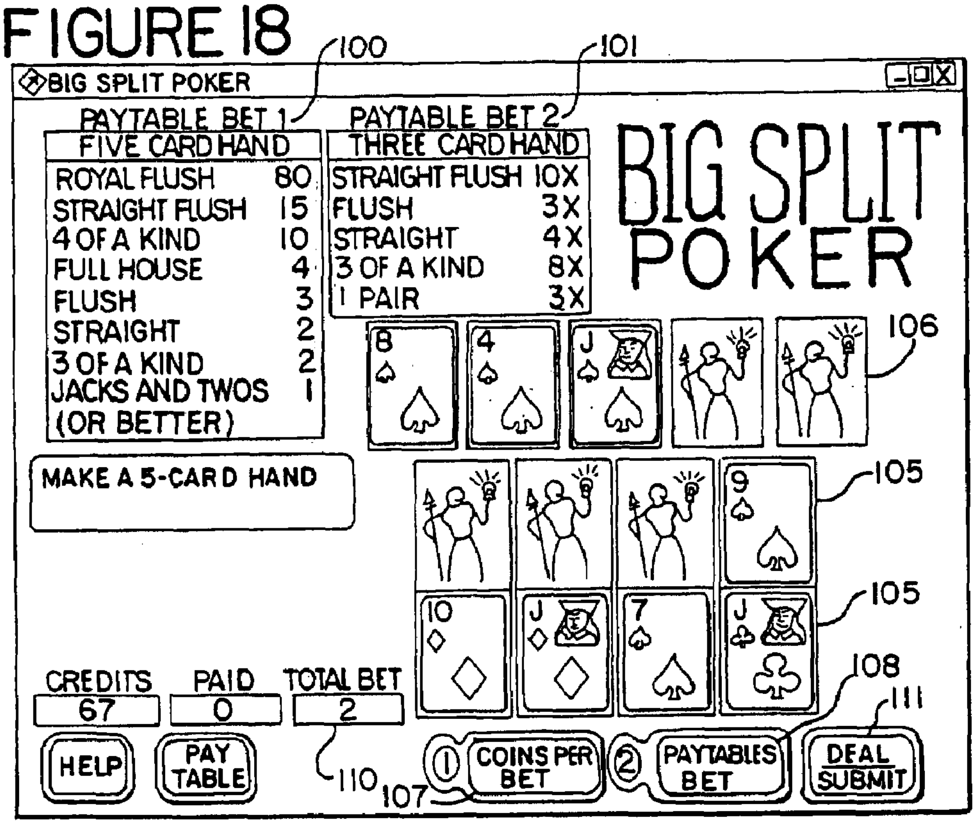
Figure 19:
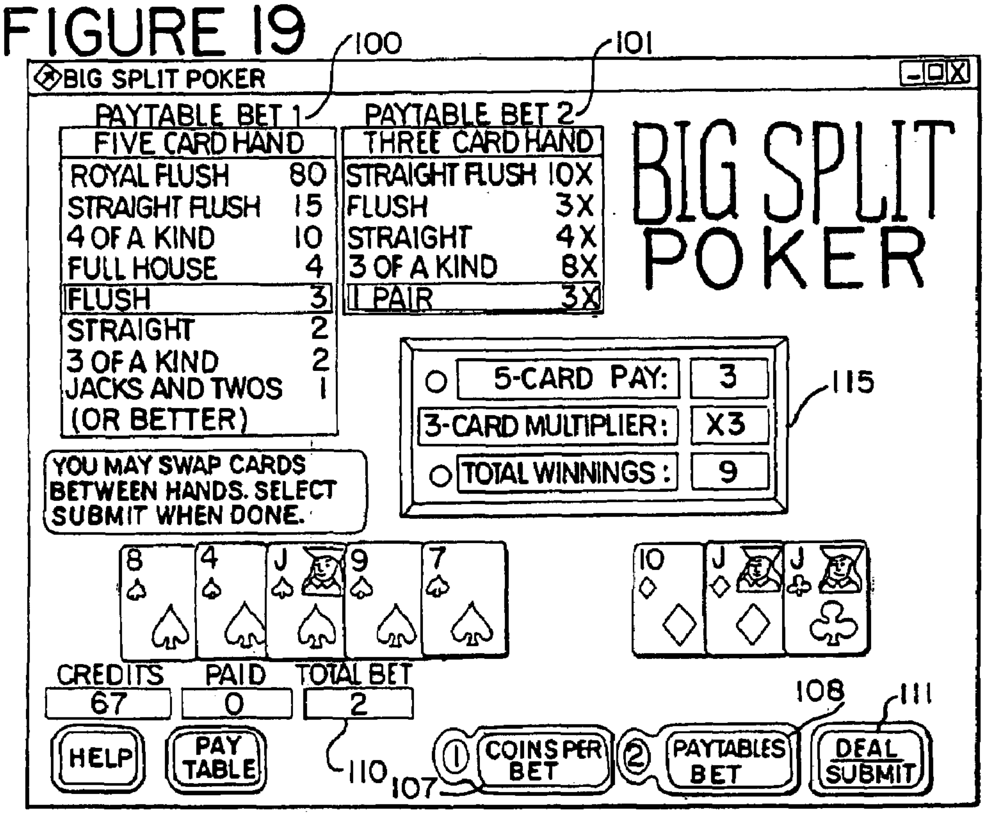
FIGS. 19 through 21 show various views of another display related to the embodiment of FIG. 16, with cards arranged into two hands.

FIG. 18 shows the display after three of the five cards have been selected for the five card hand. Once five cards have been selected by the player, the program generates another display which shows the two hands, their ranks, their pays and the total pay, as shown in FIG. 19. The rank of each hand is highlighted in the paytables 100, 101 showing a Flush in the five card hand and one Pair in the three card hand. In the winnings display box 115 in the center of the screen, it shows that the five-card paytable awards three coins for a Flush and that the multiplier for one Pair in the three card hand is 3X. The product of 9 is shown as the "Total Winnings" for setting the hand this way.

After displaying the initial hand, the program allows the player to modify the hands by swapping cards between the hands. If the player wishes to collect the indicated award, however, he or she may press the "Deal/Submit" button 111 to "Submit" this combination for collection. In this case, the game will award the number of coins shown in "Total Winnings" to the credits meter. Certain versions of the game could just as easily dispense coins to the player instead of using a credits meter, either at the player's direction (for example through the use of a cash/credit button) or as a setting by the game operator. In this case, the number of coins shown in "Total Winnings" will be dispensed to the player.

Figure 20:
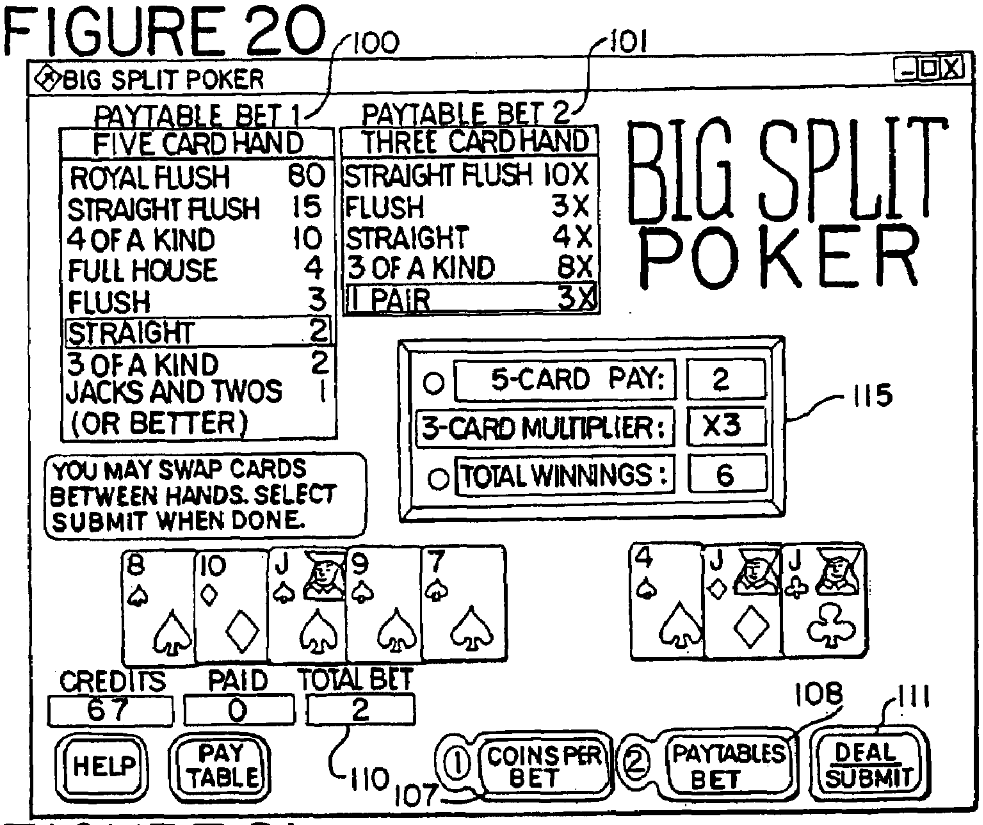

As noted, instead of submitting the hand, the player may modify the way it is broken into two hands by swapping cards. By using the pointing device, the player indicates which two cards should be swapped. If the player selected the 4 of spades and the 10 of diamonds in FIG. 19, then the display would appear as shown in FIG. 20. The five card hand is now a Straight, while the three card hand is still one-Pair. The Total Winnings for this combination would be six coins. Since playing the Flush would yield nine coins as shown in FIG. 19, the player would be better off trading the cards back before submitting the hand.

Figure 21:
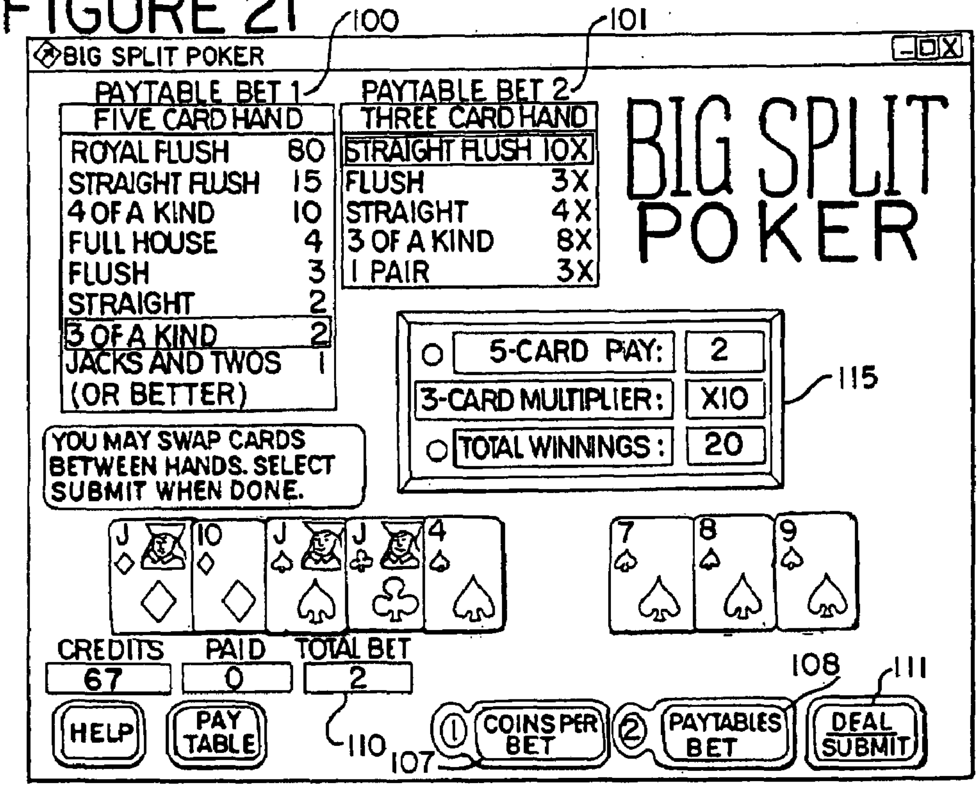

To get the best return, the player should try and find all possible five card hands that are Jacks & Twos or higher, and see if the resulting combination is the highest paying combination. FIG. 21 shows the resulting hands if the 7 of spades, 8 of spades and 9 of spades are swapped into the three card hand. Now, the resulting combination is Three of a Kind in the five card hand, which awards two coins, and a Straight-Flush in the three card hand, which multiplies it by ten, resulting in a twenty coin "Total Winnings." This is the combination that will provide the highest pay for the eight card combination that was dealt. It should be noted that the best way to play this particular hand was to use the lowest of the three paying five card combinations. It should also be noted that if this same hand was played with a bet on only one paytable, that the best hand to play would have been the Flush, which would have awarded three coins.

For each eight card hand that is received by the player, there are fifty-six possible ways to play the hand, which is the number of unique five card combinations that may be created from eight cards. This number of combinations is known as "8 choose 5" which is determined from the formula:

$$\frac{8!}{(5!*(8-5)!)} = 56$$

A novel addition to this game is a determination by the computer as to whether there exists any winning combination in the hand. If there is no way to play the hand to win (i.e., all fifty-six combinations result in a pay of zero), then the program may light and activate the Deal/Submit button 111 (or give other visual and/or aural indication) to allow the player to move on to the next hand, without the additional frustration of analyzing the cards to no avail. More hands may therefore be ultimately played, which as previously noted is beneficial in a casino or other wagering environment. In addition, or alternatively, the program may provide an audible indication such as dinging bell sound to convey that there is some way to set the hand as a winner. This feature is considered new to the full information aspect of games according to the present invention. There is no random event (such as the draw in a draw poker game) that could salvage the bad hand, and the player has decision(s) to make based upon what is revealed to reach a winning result, if there is the possibility of a winning result.

Figure 22:
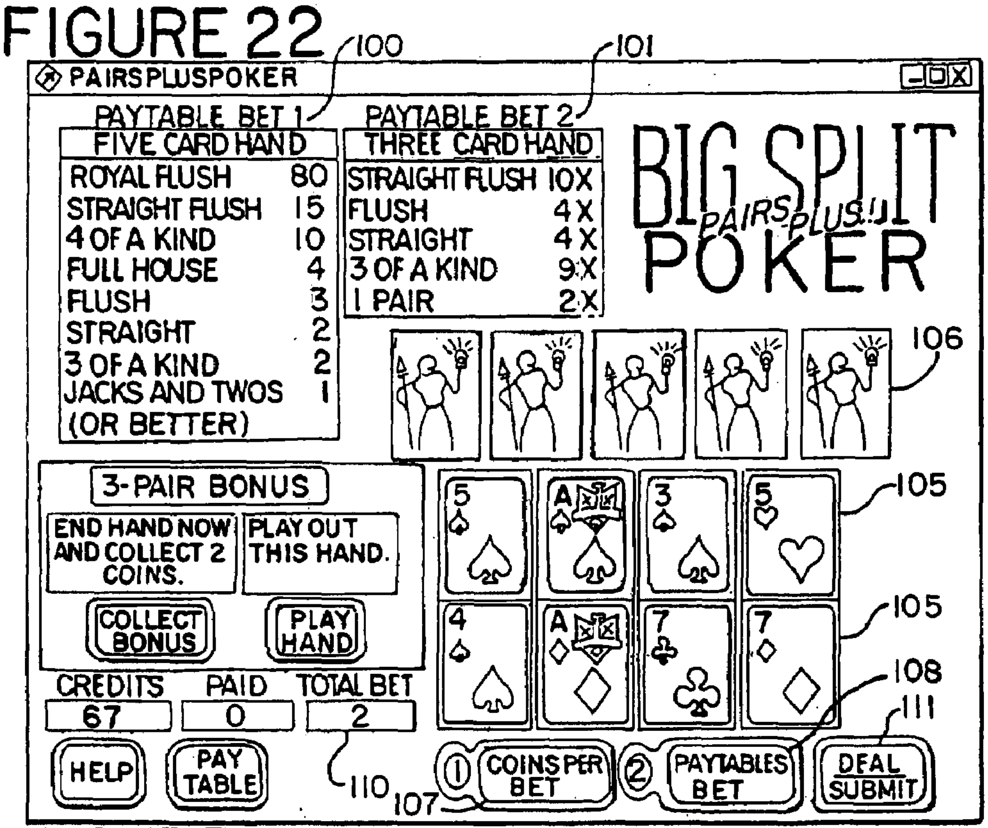
FIG. 22 is a view of a display of a modified embodiment of the game of FIG. 16.

There is also a variation of this card game embodiment that has been developed that includes bonuses for eight card hands that contain three and four pairs. While an eight card hand that is dealt to the player may contain three or four pairs, only two of the pairs may be played in the five card hand. If all of the pairs are less than Jacks, however, then this apparently good hand becomes a loser in the foregoing embodiment. The modified game uses slightly less favorable paytables; however, whenever three or four pair appear in the eight card hand, the player then has the option to take a three-pair or four-pair bonus instead of playing the hand with the paytables 100, 101. In FIG. 22, the hand has a pair of aces, a pair of 7's and a pair of 5's. As a result of three pair showing up in the hand, the button bar on the mid left of the screen offers the player the option of accepting the three pair bonus of two coins (two coins times the "Coins per Bet") or to play the hand by splitting into two hands. The three pair and four pair bonuses are only available when two paytables are being played, in this variation.

Figure 23:
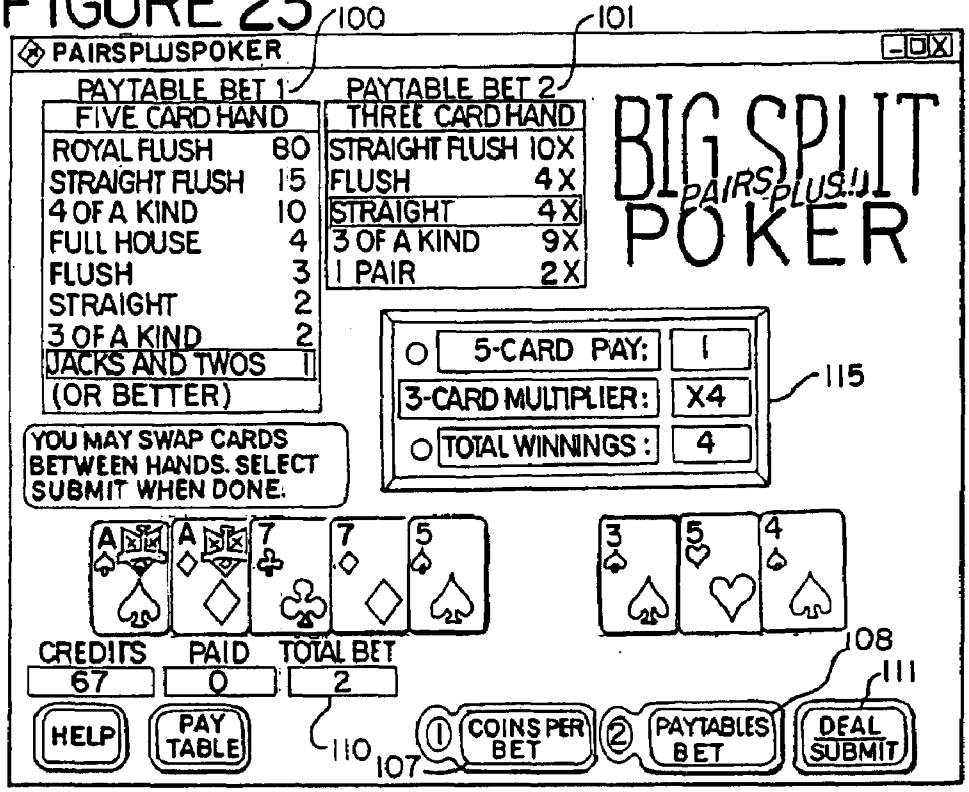
FIG. 23 is a view of a display similar in format to that of FIG. 19, using the cards shown in FIG. 22.

The optimal play for the hand shown in FIG. 22 would be to turn down the two coin bonus and play two Pair with a straight for four coins as shown in FIG. 23. There are, of course, many other bonuses that could be awarded for interesting eight card hands including 6, 7 and 8-card flushes and 6, 7, 8 card straights.

It is also anticipated that certain awards may be set up as progressive payouts, as is well known in the art, connecting one or more machines to a meter that increases until somebody wins the total, for one example. Certain awards (such as Royal Flush with Three of a Kind) would award the progressive meter instead of the paytable product.

Dealing out eight cards at random from a fifty-two card deck results in "52 choose 8" combinations or possible hands, as previously noted. It is well known that the number of combinations is calculated by:

$$\frac{52!}{8!*(52-8)!}$$

This results in 752,538,150 possible unique hands. Each of the 752,538,150 possible hands is analyzed to determine the best way to play each hand. As is made clear by the example of FIGS. 17 through 21, the optimal choice for a hand may be different when one or two paytables are played (i.e., playing a Flush in the five card hand with one paytable and playing three Jacks in the five card hand with two paytables).

The process of the analysis is the same whether using one or two paytables. Each of the 752,538,150 possible hands may be set in fifty-six different combinations dictated by "8 choose 5". A computer program iterates through each of the 752,538,150 eight card hands. For each of these hands it analyzes the pay for each of the fifty-six ways to set the hand, and increments a counter for the types of hands used to create the highest pay. In the case of one paytable, the program keeps a counter for each possible pay on paytable one. In the case of two paytables, the program keeps forty-eight separate counters for each possible combination of paytable one and paytable two (i.e., for each of the eight paytable one ranking hands there are six counters, one for each possible result on paytable two). There is a forty-ninth counter for all hands that do not pay.

The analysis is shown below for one "Coins per Bet". It is well known in the art how to expand this to higher "Coins per Bet" numbers and for the awarding of bonuses for playing higher numbers of coins. The program for occurrence analysis for one paytable does not require the paytable as input. All it requires is the ranking (and thus the pay) order of the paying hands. The occurrence list that it generates will be the same for any paytable that ranks (by pay) in the same order, because the program is simply selecting the highest ranking five card hand that can be made from each set of eight cards that may be dealt. The table of occurrences for the single paytable game that was described above is shown in Table K. Again, the program for this analysis, as for other combinational and occurrence analyses discussed herein, is well known and readily understood by those having skill in this art.

For each line in the paytable, the probability of getting such a hand is calculated by dividing the occurrences by the total number of hands (752,538,150). For each line in the paytable the Expected Value contribution (EV) is calculated as the product of the probability times the paytable value. The sum of all of the Expected Value contributions is the expected return of the game (payout percentage) which here is 0.9732 or a 97.32% return.

As long as the awards (in descending order) stay ranked as shown in Table K, then one may modify the payout percentage for this one-paytable version by changing paytable values in the Table K spreadsheet.

TABLE K

| | Occurrences | Probability | Paytable | EV |
|---|---|---|---|---|
| Royal Flush | 64,860 | 8.61883E−05 | 80 | 0.006895066 |
| Straight Flush | 546,480 | 0.000726182 | 15 | 0.010892737 |
| Four of a Kind | 2,529,262 | 0.003360975 | 10 | 0.033609751 |
| Full House | 45,652,128 | 0.060664204 | 4 | 0.242656817 |
| Flush | 50,850,320 | 0.06757175 | 3 | 0.202715251 |
| Straight | 67,072,620 | 0.089128531 | 2 | 0.178257062 |
| Three of a Kind | 38,493,000 | 0.051150895 | 2 | 0.10230179 |
| Jacks & Twos or Better | 147,430,584 | 0.19591111 | 1 | 0.19591111 |
| Losing Hands | 399,898,896 | 0.531400164 | 0 | 0 |
| | 752,538,150 | 1.0000 | | 0.9732 |

The analysis of the two-paytable version of the game is more complex because the computer program that generates the occurrence counts uses the two paytables as input. For each of the 752,538,150 eight-card hands, this program will analyze each of the fifty-six ways to set the hand to determine the highest paying way to set the hand. The pay is determined by multiplying the five-card paytable value by the three-card paytable multiplier. The paytable is used as input, because as values in either paytable are changed, the changing of the resulting products will likely change and alter the pay ranking of certain five-card/three-card hand combinations. To illustrate this, Table L shows the combined paytable matrix for a game that we will later see has a return of 97.86%. Table M shows the combined paytable matrix for a game that has a return of 94.62%. In these tables L and M, the five-card paytable is shown vertically and the three card multiplier table is shown horizontally. Each "square" in the pay matrix (the non-bold numbers) is the product of the "pays" of the five card and three card values for that type of hand. For example, consider the hand of Table N. In Table L, one can see that if this hand is set with a five-card Three of a Kind and three-card Straight, it would pay eight coins. The hand could also be set as a five-card Flush and three-card Pair, which would pay nine coins. The occurrence analyzer counts such a hand as an occurrence of Flush-Pair, and increments the counter for that combination. If, however the occurrence analyzer was given the paytable of Table M as input, then it would find that the eight coin award for a five-card Three of a Kind with a three-card Straight will beat the six coin award for playing a five-card Flush with a three-card pair. With the Table M paytable as input, the occurrence analyzer increments the counter for three of a Kind-Straight for the same hand of Table N.

TABLE N

| Sample Hand | |
|---|---|
| 1) | King of Diamonds |
| 2) | King of Hearts |
| 3) | King of Clubs |
| 4) | 3 of Clubs |
| 5) | 4 of Clubs |
| 6) | 7 of Clubs |
| 7) | 8 of Clubs |
| 8) | 9 of Diamonds |

TABLE L

| Paytable for 97.86% | | Bust 1 | Pair 3 | 3 of a Kind 8 | Straight 4 | Flush 3 | Straight Flush 10 |
|---|---|---|---|---|---|---|---|
| Royal Flush | **80** | 80 | 240 | 640 | 320 | 240 | 800 |
| Straight Flush | **15** | 15 | 45 | 120 | 60 | 45 | 150 |
| Four of a Kind | **10** | 10 | 30 | 80 | 40 | 30 | 100 |
| Full House | **4** | 4 | 12 | 32 | 16 | 12 | 40 |
| Flush | **3** | 3 | 9 | 24 | 12 | 9 | 30 |
| Straight | **2** | 2 | 6 | 16 | 8 | 6 | 20 |

TABLE L-continued

| Paytable for 97.86% | | Bust 1 | Pair 3 | 3 of a Kind 8 | Straight 4 | Flush 3 | Straight Flush 10 |
|---|---|---|---|---|---|---|---|
| Three of a Kind | **2** | 2 | 6 | 16 | 8 | 6 | 20 |
| Jacks & Twos or Better | **1** | 1 | 3 | 8 | 4 | 3 | 10 |
| Losing Hands | **0** | 0 | 0 | 0 | 0 | 0 | 0 |

TABLE M

| Paytable for 94.62% | | Bust 1 | Pair 2 | 3 of a Kind 10 | Straight 4 | Flush 4 | Straight Flush 10 |
|---|---|---|---|---|---|---|---|
| Royal Flush | **80** | 80 | 160 | 800 | 320 | 320 | 800 |
| Straight Flush | **20** | 20 | 40 | 200 | 80 | 80 | 200 |
| Four of a Kind | **10** | 10 | 20 | 100 | 40 | 40 | 100 |
| Full House | **3** | 3 | 6 | 30 | 12 | 12 | 30 |
| Flush | **3** | 3 | 6 | 30 | 12 | 12 | 30 |
| Straight | **2** | 2 | 4 | 20 | 8 | 8 | 20 |
| Three of a Kind | **2** | 2 | 4 | 20 | 8 | 8 | 20 |
| Jacks & Twos or Better | **1** | 1 | 2 | 10 | 4 | 4 | 10 |
| Losing Hands | **0** | 0 | 0 | 0 | 0 | 0 | 0 |

The occurrence analyzer generates a count for each non-bold number (i.e., the numbers after the first column of numbers) in the Table L grid. Because of the computing time required to analyze fifty-six combinations for each of 752,538,150 hands, the program does not analyze the three-card hand for any combination in which the five card hand is a loser (less than Jacks & Twos). Therefore, an occurrence count is generated for each combination in Table L that has a non-zero pay (forty-eight paying combinations) and a forty-ninth counter keeps track of all losing hands. The occurrence table for the paytable of Table L is shown in Table O.

TABLE O

| Occurrences | Bust | Pair | 3 of a Kind | Straight | Flush | Straight Flush | |
|---|---|---|---|---|---|---|---|
| Royal Flush | 47,940 | 10,896 | 148 | 2,220 | 3,488 | 168 | 64,860 |
| Straight Flush | 394,620 | 95,100 | 1,320 | 19,128 | 30,692 | 1,456 | 542,316 |
| Four of a Kind | 1,061,340 | 717,312 | 27,534 | 264,492 | 378,152 | 21,044 | 2,469,874 |
| Full House | 0 | 4,890,240 | 82,368 | 1,599,148 | 2,229,408 | 126,516 | 8,927,680 |
| Flush | 31,786,764 | 8,761,980 | 159,304 | 2,419,632 | 4,157,716 | 187,332 | 47,472,728 |
| Straight | 41,408,340 | 15,053,112 | 277,560 | 3,372,300 | 6,739,848 | 353,496 | 67,204,656 |
| Three of a Kind | 16,113,600 | 21,783,888 | 1,008,896 | 16,380,984 | 19,311,912 | 1,688,772 | 76,288,052 |
| Jacks & Twos or Better | 84,720,384 | 23,912,976 | 0 | 19,025,892 | 20,011,824 | 1,998,012 | 149,669,088 |
| Losing Hands | 399,898,896 | | | | | | 399,898,896 |
| | 575,431,884 | 75,225,504 | 1,557,130 | 43,083,796 | 52,863,040 | 4,376,796 | 752,538,150 |

A probability table showing the probability of each of the forty-eight winning combinations as well as the probability of losing is shown in Table P. These values were computed by dividing the corresponding square in the Table O occurrences table by the 752,538,150 total possible hands. As always, the sum of all values in the probability table equals 1.0.

TABLE P

| | Probability | | | | | | |
|---|---|---|---|---|---|---|---|
| | Bust | Pair | 3 of a Kind | Straight | Flush | Straight Flush | |
| Royal Flush | 6.37E-05 | 1.45E-05 | 1.97E-07 | 2.95E-06 | 4.63E-06 | 2.23E-07 | 8.62E-05 |
| Straight Flush | 0.000524 | 0.000126 | 1.75E-06 | 2.54E-05 | 4.08E-05 | 1.93E-06 | 0.000721 |
| Four of a Kind | 0.00141 | 0.000953 | 3.66E-05 | 0.000351 | 0.000503 | 2.8E-05 | 0.003282 |
| Full House | 0 | 0.006498 | 0.000109 | 0.002125 | 0.002963 | 0.000168 | 0.011863 |
| Flush | 0.042239 | 0.011643 | 0.000212 | 0.003215 | 0.005525 | 0.000249 | 0.063083 |
| Straight | 0.055025 | 0.020003 | 0.000369 | 0.004481 | 0.008956 | 0.00047 | 0.089304 |
| Three of a Kind | 0.021412 | 0.028947 | 0.001341 | 0.021768 | 0.025662 | 0.002244 | 0.101374 |
| Jacks & Twos or Better | 0.11258 | 0.031776 | 0 | 0.025282 | 0.026592 | 0.002655 | 0.198886 |
| Losing Hands | 0.5314 | | | | | | 0.5314 |
| | 0.764655 | 0.099962 | 0.002069 | 0.057251 | 0.070246 | 0.005816 | 1 |

The Expected value contribution of each of the forty-eight winning pays is computed by multiplying the paytable value (from Table L) times the probability of receiving that pay (from Table P) and dividing this product by the two coin bet required to play both paytables. A table of these expected value contributions is shown in Table Q. By computing the sum of the forty-eight expected value contributions the total of 0.978648 indicates a return of 97.86% of coins wagered by the player in the long run.

TABLE Q

| | Expected Value per coin bet | | | | | | |
|---|---|---|---|---|---|---|---|
| | Bust | Pair | 3 of a Kind | Straight | Flush | Straight Flush | |
| Royal Flush | 0.002548 | 0.001737 | 6.29E-05 | 0.000472 | 0.000556 | 8.93E-05 | 0.005466 |
| Straight Flush | 0.003933 | 0.002843 | 0.000105 | 0.000763 | 0.000918 | 0.000145 | 0.008707 |
| Four of a Kind | 0.007052 | 0.014298 | 0.001464 | 0.007029 | 0.007538 | 0.001398 | 0.038778 |
| Full House | 0 | 0.03899 | 0.001751 | 0.017 | 0.017775 | 0.003362 | 0.078879 |
| Flush | 0.063359 | 0.052395 | 0.00254 | 0.019292 | 0.024862 | 0.003734 | 0.166182 |
| Straight | 0.055025 | 0.060009 | 0.002951 | 0.017925 | 0.026868 | 0.004697 | 0.167476 |
| Three of a Kind | 0.021412 | 0.086842 | 0.010725 | 0.087071 | 0.076987 | 0.022441 | 0.305478 |
| Jacks & Twos or Better | 0.05629 | 0.047665 | 0 | 0.050565 | 0.039889 | 0.013275 | 0.207683 |
| Losing Hands | 0 | | | | | | 0 |
| | 0.209619 | 0.304779 | 0.019599 | 0.200116 | 0.195393 | 0.049143 | 0.978648 |

It will be understood that the payout percentage may not be as easily modified as was shown for the one paytable version. An approximation of the payout for a modified paytable may be made by modifying the paytable values in Table L and recomputing Tables O, P and Q based on those values. The payoff percentage in the newly computed Table Q can be used as a guideline to help achieve targeted percentages. Then, the new paytable values will be input to the occurrence analyzer program to generate a new version of Table O, to then use to determine the actual payout percentage.

For example, if the paytable of Table M were substituted, then one would get the resulting Table R, which is created using the occurrence/probability data from Tables O and P. This Table R shows that if the hands were played optimally for the Table L paytable but awarded with the Table M paytable, that the game would return 93.17%. If the goal was to reduce the payout percentage by a few points, then one would now re-run the occurrence analyzer using the Table M paytable as input.

TABLE R

Expected Value per coin bet
Using FIG. 12 Paytable and FIG. 13 Occurrence Data

| | Bust | Pair | 3 of a Kind | Straight | Flush | Straight Flush | |
|---|---|---|---|---|---|---|---|
| Royal Flush | 0.002548 | 0.001158 | 7.87E-05 | 0.000472 | 0.000742 | 8.93E-05 | 0.005088 |
| Straight Flush | 0.005244 | 0.002527 | 0.000175 | 0.001017 | 0.001631 | 0.000193 | 0.010788 |
| Four of a Kind | 0.007052 | 0.009532 | 0.001829 | 0.007029 | 0.01005 | 0.001398 | 0.036891 |
| Full House | 0 | 0.019495 | 0.001642 | 0.01275 | 0.017775 | 0.002522 | 0.054184 |
| Flush | 0.063359 | 0.03493 | 0.003175 | 0.019292 | 0.03315 | 0.003734 | 0.157639 |
| Straight | 0.055025 | 0.040006 | 0.003688 | 0.017925 | 0.035825 | 0.004697 | 0.157166 |
| Three of a Kind | 0.021412 | 0.057894 | 0.013407 | 0.087071 | 0.102649 | 0.022441 | 0.304874 |
| Jacks & Twos or Better | 0.05629 | 0.031776 | 0 | 0.050565 | 0.053185 | 0.013275 | 0.205091 |
| Losing Hands | 0 | | | | | | 0 |
| | 0.21093 | 0.197319 | 0.023996 | 0.19612 | 0.255007 | 0.04835 | 0.931722 |

The occurrence table when the Table M paytable is used as input is shown in Table S.

TABLE S

Occurrences

| | Bust | Pair | 3 of a Kind | Straight | Flush | Straight Flush | |
|---|---|---|---|---|---|---|---|
| Royal Flush | 47,940 | 10,896 | 148 | 2,220 | 3,488 | 168 | 64,860 |
| Straight Flush | 398,784 | 95,100 | 1,320 | 19,128 | 30,692 | 1,456 | 546,480 |
| Four of a Kind | 1,061,340 | 717,312 | 27,534 | 230,364 | 416,336 | 21,044 | 2,473,930 |
| Full House | 0 | 1,607,148 | 82,368 | 1,526,688 | 2,229,408 | 122,460 | 5,568,072 |
| Flush | 26,708,844 | 7,145,148 | 159,304 | 2,419,632 | 4,193,356 | 187,332 | 40,813,616 |
| Straight | 41,422,620 | 14,944,884 | 327,792 | 3,245,148 | 6,918,840 | 349,332 | 67,208,616 |
| Three of a Kind | 16,113,600 | 21,783,888 | 1,081,356 | 11,209,476 | 26,788,368 | 1,638,540 | 78,615,228 |
| Jacks & Twos or Better | 84,720,384 | 23,644,980 | 2,583,324 | 16,475,424 | 27,893,928 | 2,030,412 | 157,348,452 |
| Losing Hands | 399,898,896 | | | | | | 399,898,896 |
| | 570,372,408 | 69,949,356 | 4,263,146 | 35,128,080 | 68,474,416 | 4,350,744 | 752,538,150 |

The probability table when the Table M paytable is used as input is shown in Table T.

TABLE T

Probability

| | Bust | Pair | 3 of a Kind | Straight | Flush | Straight Flush | |
|---|---|---|---|---|---|---|---|
| Royal Flush | 6.37E−05 | 1.45E−05 | 1.97E−07 | 2.95E−06 | 4.63E−06 | 2.23E−07 | 8.62E−05 |
| Straight Flush | 0.00053 | 0.000126 | 1.75E−06 | 2.54E−05 | 4.08E−05 | 1.93E−06 | 0.000726 |
| Four of a Kind | 0.00141 | 0.000953 | 3.66E−05 | 0.000306 | 0.000553 | 2.8E−05 | 0.003287 |
| Full House | 0 | 0.002136 | 0.000109 | 0.002029 | 0.002963 | 0.000163 | 0.007399 |
| Flush | 0.035492 | 0.009495 | 0.000212 | 0.003215 | 0.005572 | 0.000249 | 0.054235 |
| Straight | 0.055044 | 0.019859 | 0.000436 | 0.004312 | 0.009194 | 0.000464 | 0.089309 |
| Three of a Kind | 0.021412 | 0.028947 | 0.001437 | 0.014896 | 0.035597 | 0.002177 | 0.104467 |
| Jacks & Twos or Better | 0.11258 | 0.03142 | 0.003433 | 0.021893 | 0.037066 | 0.002698 | 0.20909 |
| Losing Hands | 0.5314 | | | | | | 0.5314 |
| | 0.757932 | 0.092951 | 0.005665 | 0.046679 | 0.090991 | 0.005781 | 1 |

Finally, the expected value contribution per coin played table is shown in Table U. The resulting expected return (payout percentage) for the paytable of Table M turns out to be 94.62% as shown in Table U. If this is acceptable, then using the paytable of Table M will provide this return. If a percentage closer to the 93.17% that was targeted in Table R is desirable, then the steps taken to compute a new percentage need to be taken again to lower the payout a little more.

TABLE U

| | Expected Value per coin bet | | | | | | |
|---|---|---|---|---|---|---|---|
| | Bust | Pair | 3 of a Kind | Straight | Flush | Straight Flush | |
| Royal Flush | 0.002548 | 0.001158 | 7.87E−05 | 0.000472 | 0.000742 | 8.93E−05 | 0.005088 |
| Straight Flush | 0.005299 | 0.002527 | 0.000175 | 0.001017 | 0.001631 | 0.000193 | 0.010844 |
| Four of a Kind | 0.007052 | 0.009532 | 0.001829 | 0.006122 | 0.011065 | 0.001398 | 0.036998 |
| Full House | 0 | 0.006407 | 0.001642 | 0.012172 | 0.017775 | 0.002441 | 0.040437 |
| Flush | 0.053238 | 0.028484 | 0.003175 | 0.019292 | 0.033434 | 0.003734 | 0.141357 |
| Straight | 0.055044 | 0.039719 | 0.004356 | 0.017249 | 0.036776 | 0.004642 | 0.157785 |
| Three of a Kind | 0.021412 | 0.057894 | 0.014369 | 0.059582 | 0.142389 | 0.021774 | 0.317421 |
| Jacks & Twos or Better | 0.05629 | 0.03142 | 0.017164 | 0.043786 | 0.074133 | 0.01349 | 0.236284 |
| Losing Hands | 0 | | | | | | 0 |
| | 0.200883 | 0.177142 | 0.04279 | 0.159693 | 0.317945 | 0.047762 | 0.946214 |

The process for determining the payout percentage of the version of the game that provides special bonuses for three and four pair or other bonus hands is done in a similar manner, with expected value contributions added for hands that would collect these bonuses.

Figure 25:
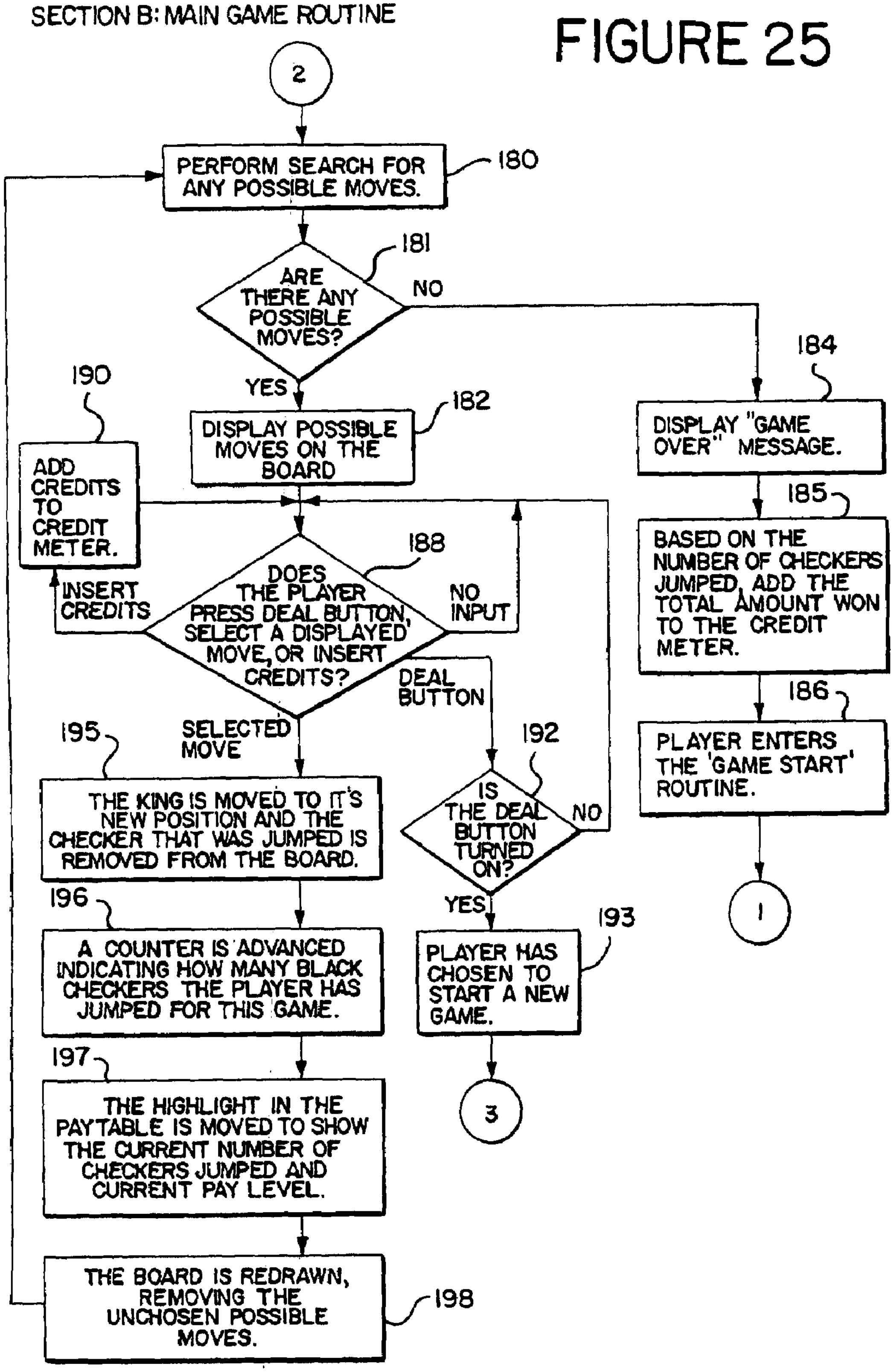
Figure 26:
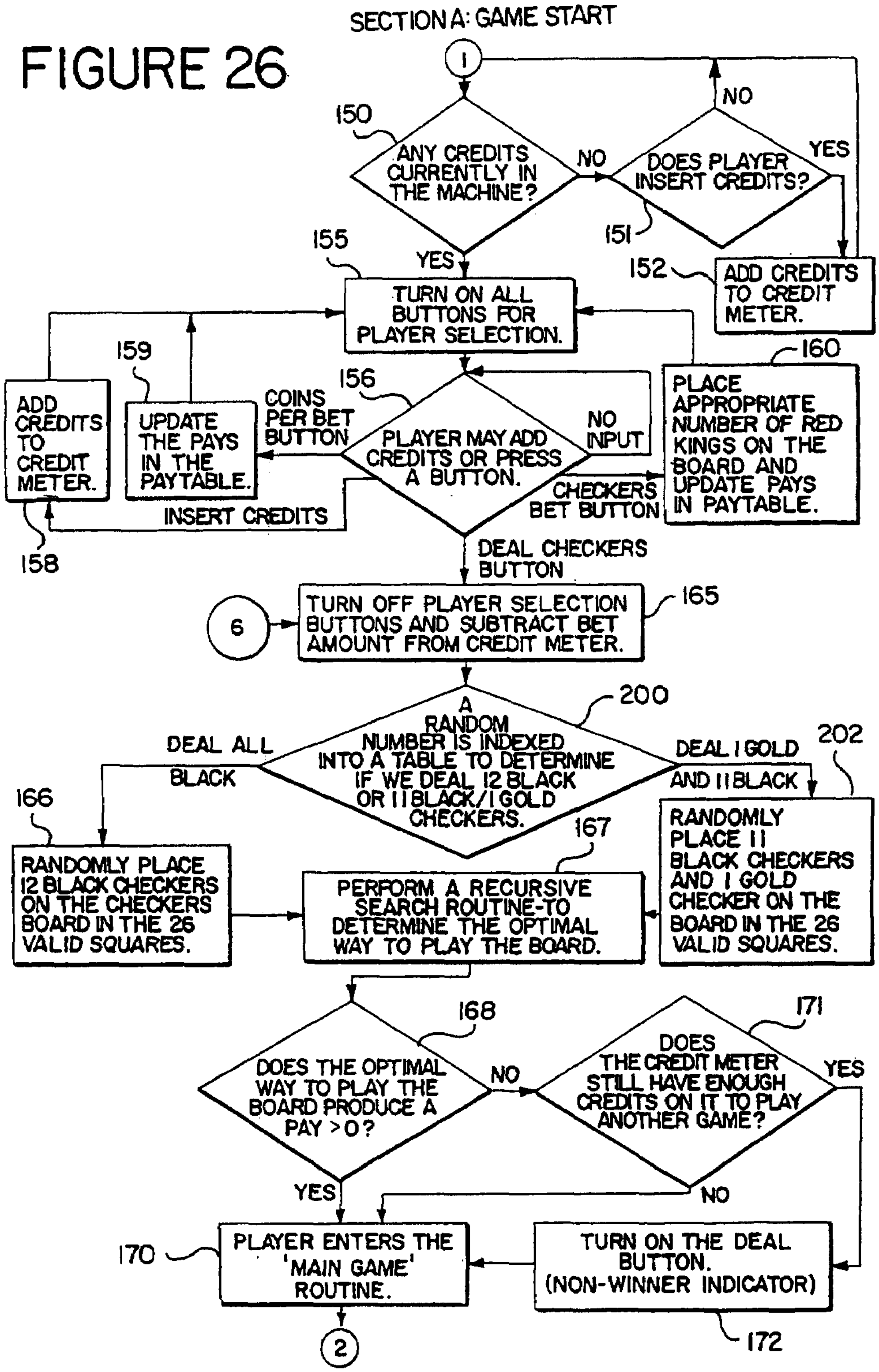
FIGS. 26 through 29 are similar flowcharts to the game of FIGS. 24 and 25, but with a bonus game added.
Figure 27:
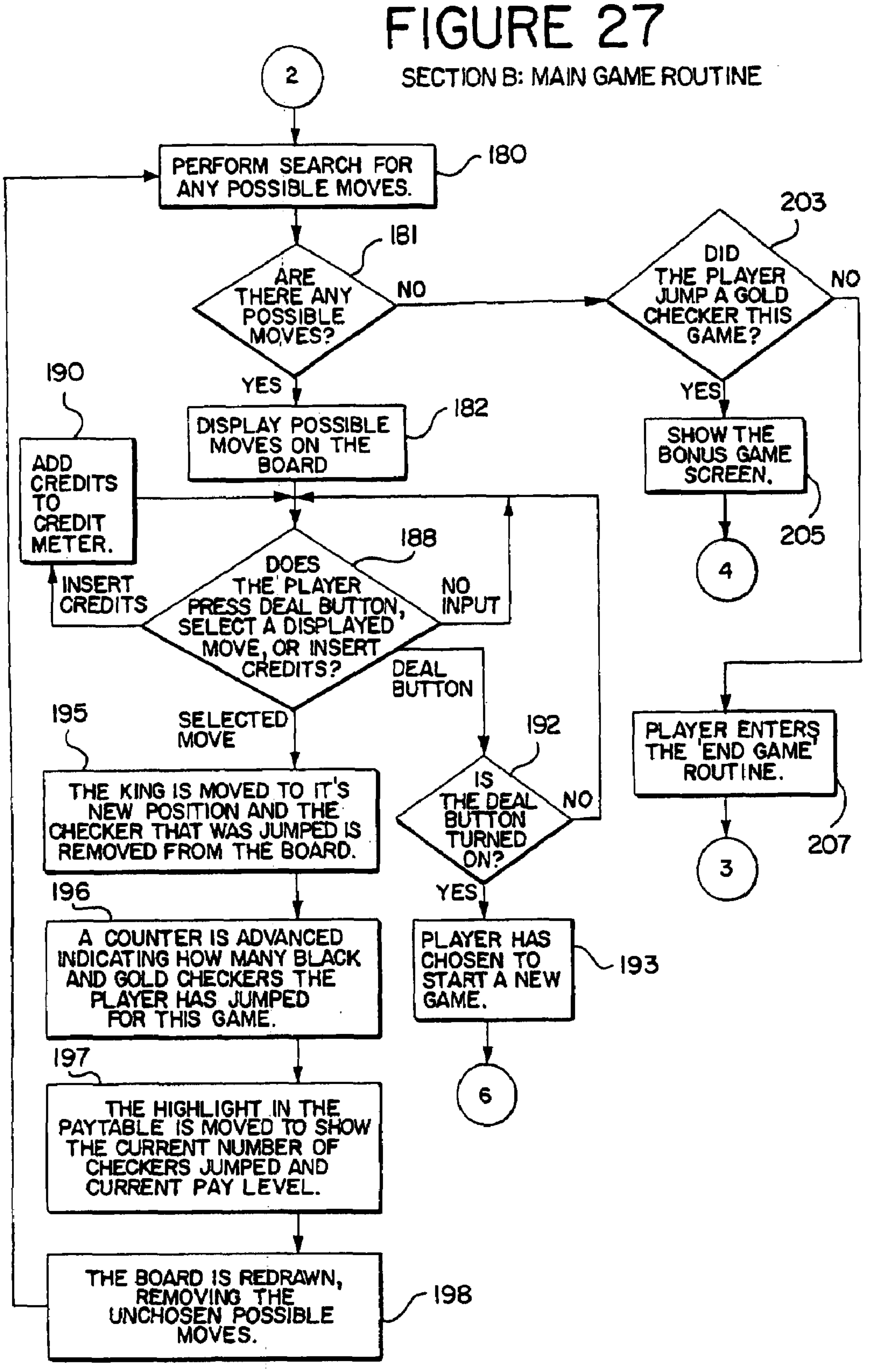

Referring now to FIGS. 24 and 25, flow diagrams of a program for a Checkers game previously described and made in accordance with the invention are illustrated. The program in FIGS. 24 and 25 does not include the bonus game (the gold checker) described above.

FIG. 24 generally describes the start-up of the Checkers game. First, an assessment of whether credit(s) are present is undertaken beginning at step 150. If none is present, then a check is made as to whether the player has inserted the relevant coin, credit card, etc., for necessary credit(s) at step 151. If so, then at step 152 the credit(s) are registered and displayed at 52 (e.g., FIG. 11). All available player buttons are then activated for initiation of play at 155.

At this stage, the player enters a set-up loop where he or she may choose to add more credits or proceed with play at step 156. If credits are added, these are registered on the meter display 52 (FIG. 11) at step 158, and the program loops back to step 156. The Coins per Checker also referred to as Coins per Bet button 50 can alternatively be engaged from step 156, causing the coins-per-checker setting to be modified, and using the new value to update the applicable paytable 48 at step 159, looping back to step 156. Still alternatively, the Checker Bet button 42 can be engaged, resulting in placement of the requisite number of red Kings selected for play, at step 160.

Ultimately, the Deal Checkers button 46 is engaged out of step 156. At this stage, the player selection button options are turned off (step 165), and the Total Bet (meter 49, FIG. 11) is subtracted from the Total Credits 52. The program then proceeds at step 166 to place the twelve black checkers on the board 40 in the random fashion described above.

In this embodiment, the program then performs a recursive search routine for the optimal way to play the board at step 167. If the result is one that produces a payout, then at step 168 the player enters a play mode (the "main game" routine) for decisional movement of the red King(s), at step 170. If there is no payout available because of the initial gameboard arrangement, then the program proceeds at step 171 to assess whether there is sufficient credit(s) remaining for another game. If yes, then the Deal Checkers button 46 lights (step 172), providing the player with a visual signal that the game cannot be won, with a return to the main game routine 170. Likewise, if there are insufficient credit(s), the player is returned to step 170, but without the visual Deal Checkers indicator. Note here that an aural indicator can also be provided as a step to indicate that there is a winning sequence presented on the board, such as in the "yes" branch of step 168.

Turning now to FIG. 25 (the main game routine), the program executes a search for possible moves at step 180 (beginning at point 2 of this Figure). If there is/are (step 181), the moves are then displayed on the board at step 182. If there is no move to be made, then a "Game Over" message or the like is displayed at step 184. If there have been any checkers jumped, the indicated value of the paytable including any applicable multiplier is added to the credit meter 52 at step 185. The start-up routine is then re-initiated at step 186 (returning to point 1 of FIG. 24).

If at step 181 there is a possible move (jump), then the player has decisional options at step 188. In this embodiment, the player has an option of adding more credits via step 190, selecting a move (such as if more than one is presented), or actuating the Deal Checkers Button 46 to start a new game. Following the latter sequence, the program first checks to see if the Deal Checkers Button 46 is available as an option (i.e., is the current game unwinnable and are there sufficient credit(s) for a new game? (step 192)). If the button 46 is not available, then the player is looped back to step 188, while ignoring the "deal" button. If the button is activated, then a new game is initiated at step 193, with a return at point 3 of FIG. 24.

In the event that a move is available and selected (step 188), the selected move is executed at step 195. A count is made of the checker removed, and a counter is advanced at step 196. The paytable is also highlighted as to the status of the checker(s) jumped, and the payout in step 197. The program then proceeds to a display of the board post-movement at step 198, then looping back to step 180 for assessment of any further moves.

FIGS. 26 through 29 are flow diagrams of a program for the embodiment of the Checkers game including the gold checker bonus game described above. Referring to point 6 of FIG. 26, it will be seen that a step 200 in the game start-up sequence is added wherein a random number is indexed in a predetermined table to determine if the gold checker is to be substituted for one of the twelve black checkers. If not, then all black checkers are placed on the board per step 166. If so, then eleven black and the one gold checker are randomly placed at step 202. Operation of the program then continues as before, with entry into the main game sequence at point 2 of FIG. 27.

The main game sequence now has a sub-routine for the bonus round. This is engaged at the end of the regular game (step 181) if the player has jumped the gold checker (step 203). If the player has not, then the program proceeds to step 207, with initiation of an end game routine (see discussion in relation to FIG. 29 hereafter). If the gold checker has been jumped, then the bonus screen is shown at step 205, and the bonus game is initiated.

Figure 28:
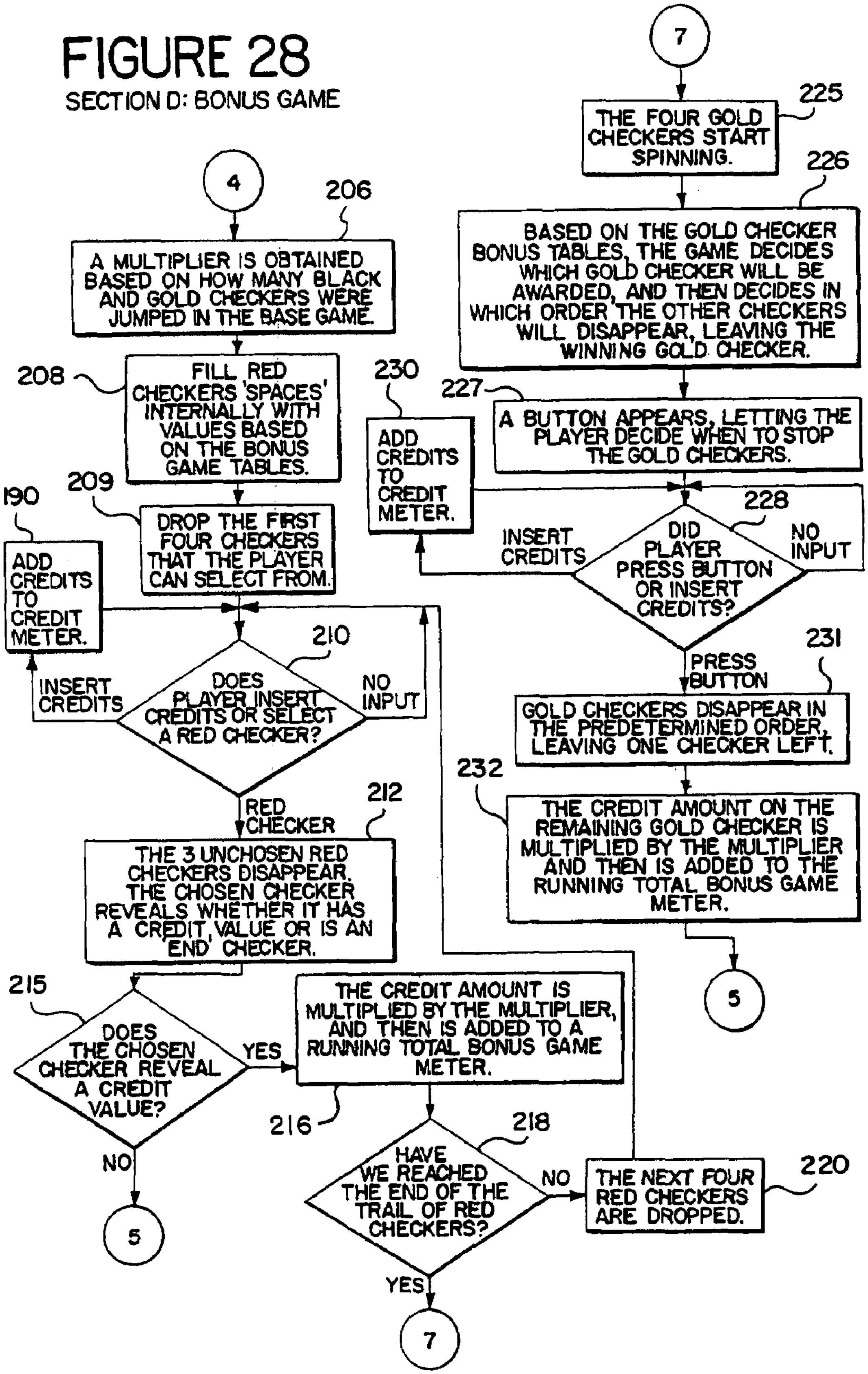

Turning to point 4 of FIG. 28, in this embodiment a multiplier is generated by the program related to the number of checkers jumped in the main game at step 206. Red checker values, including the "End Game" values, are established for the bonus checkerboard 40' (FIG. 15). These are set at step 208 based upon predetermined bonus game tables provided in the programming. The first four red checkers are then displayed for the player's selection of one at step 209.

Decisional step 210 then presents the player with options of selecting a red checker or inserting credits. If credits are added at step 190, the player is then looped back to step 210. A selection of a red checker is then made, with the remaining checkers thereby being removed at step 212. The value of the checker or End Game is revealed, according to what has been preset at step 208. If there is a credit value at step 215, this value is then increased by the foregoing multiplier of step 206 at step 216, and displayed on the total bonus meter 68. If there is no credit value, then one proceeds to point 5 (FIG. 29).

In the event that the player has not yet circumnavigated the bonus board to the end, step 218 then proceeds to the next four red checkers in the sequence at step 220, looping back to step 210 at this stage. If, however, the player has been lucky enough to reach the end of the trail in the bonus sequence, then a final round is initiated at point 7.

This final round commences with the four gold checkers in the center of the screen display (FIG. 15, 70*a* through 70*d*) spinning at step 225. A predetermined gold checker bonus table provided in the programming is read, and one of the checkers 70*a* through 70*d* is selected at step 226, and an order of disappearance of the other checkers is likewise established. Here, a button may be provided at step 227 to permit the player to stop the spinning checkers. Step 228 determines if the player has chosen to stop the spinning, or insert more credits. If more credits are inserted at step 230, the player is looped back to step 228. Eventually, the button is pressed, and the gold checkers disappear at step 231 according to the sequence set at step 226. The credit amount on the last gold checker is then increased by the multiplier (of step 206) at step 232, with the total being added to the amount displayed for the bonus game (at 68). The player is then sent to an end game sub-routine at point 5 (see FIG. 29). This same end-game sub-routine is engaged if the player picks an End Game value for a red checker, from step 215.

Figure 29:
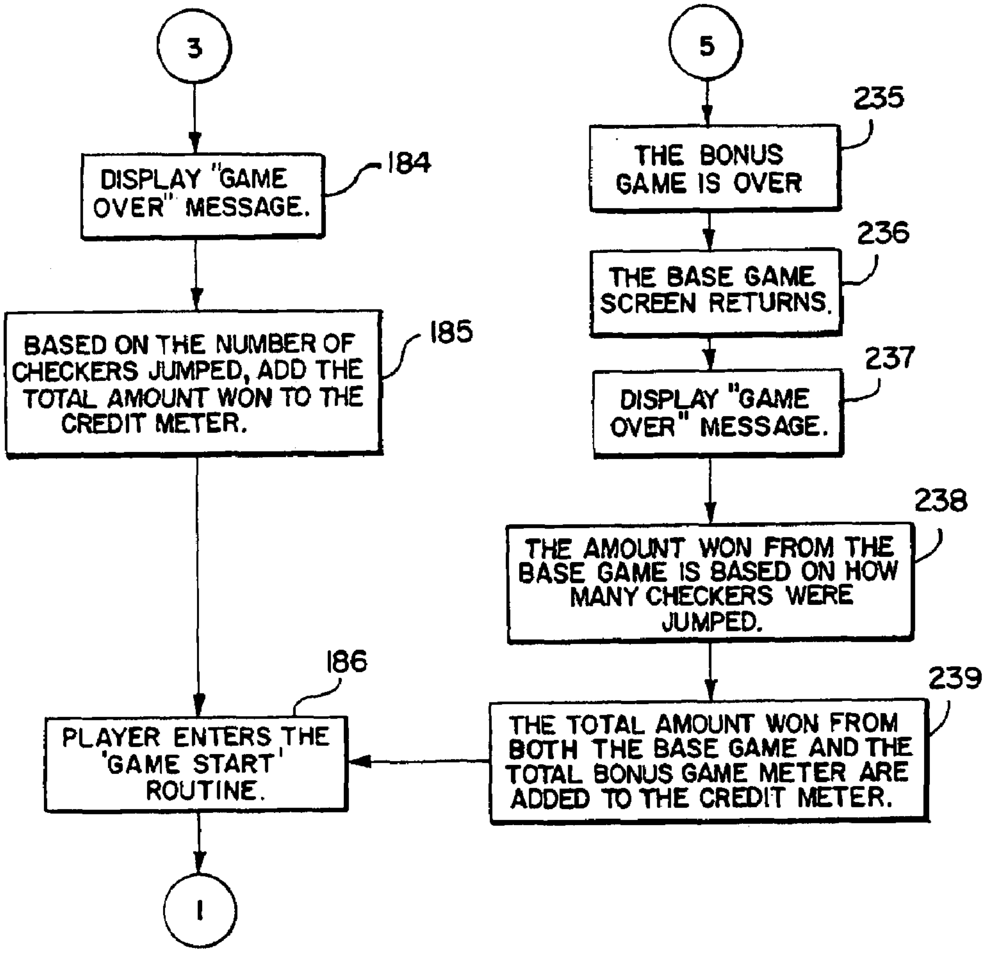

In FIG. 29, a display of "Bonus Game Over" or the like could be shown to the player at step 235. The program then proceeds at 236 to the base game display screen, with a "Game Over" message now appearing at step 237. The total amount won on the base game is then registered (step 238), added to the total amount won in the bonus game, with the sum total then being added to credits at step 239. The program at this stage returns (step 186) to point 1 of the game start-up.

If the bonus round is not entered, another end-game sub-routine is used from step 207. Referring once again to FIG. 29, at point 3 this sub-routine follows the same sequence of steps 184 and 185 previously described, leading up to step 186.

Figure 30:
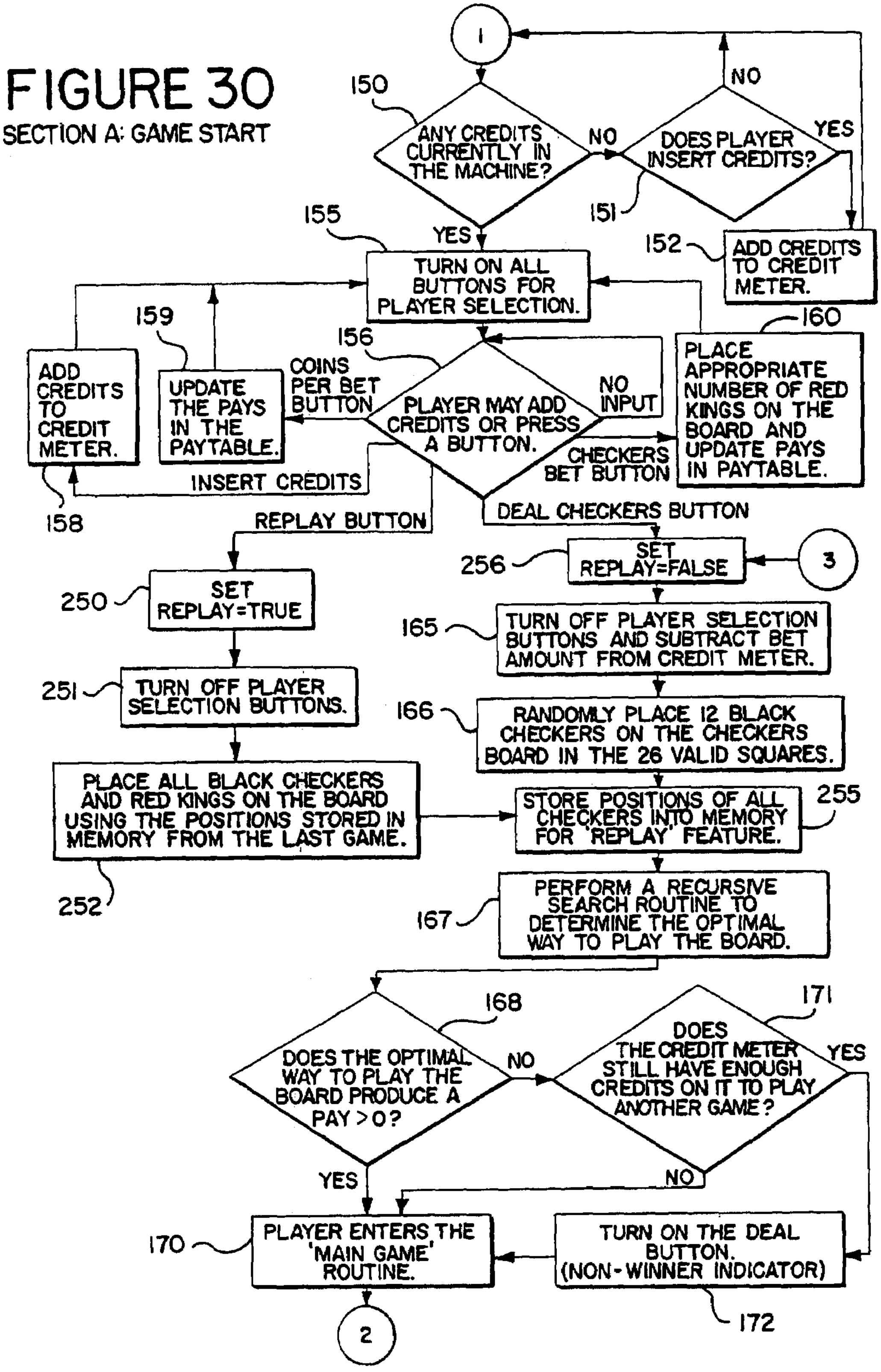
FIGS. 30 and 31 are similar flowcharts to the game of FIGS. 24 and 25, but with a teaching program added.
Figure 31:
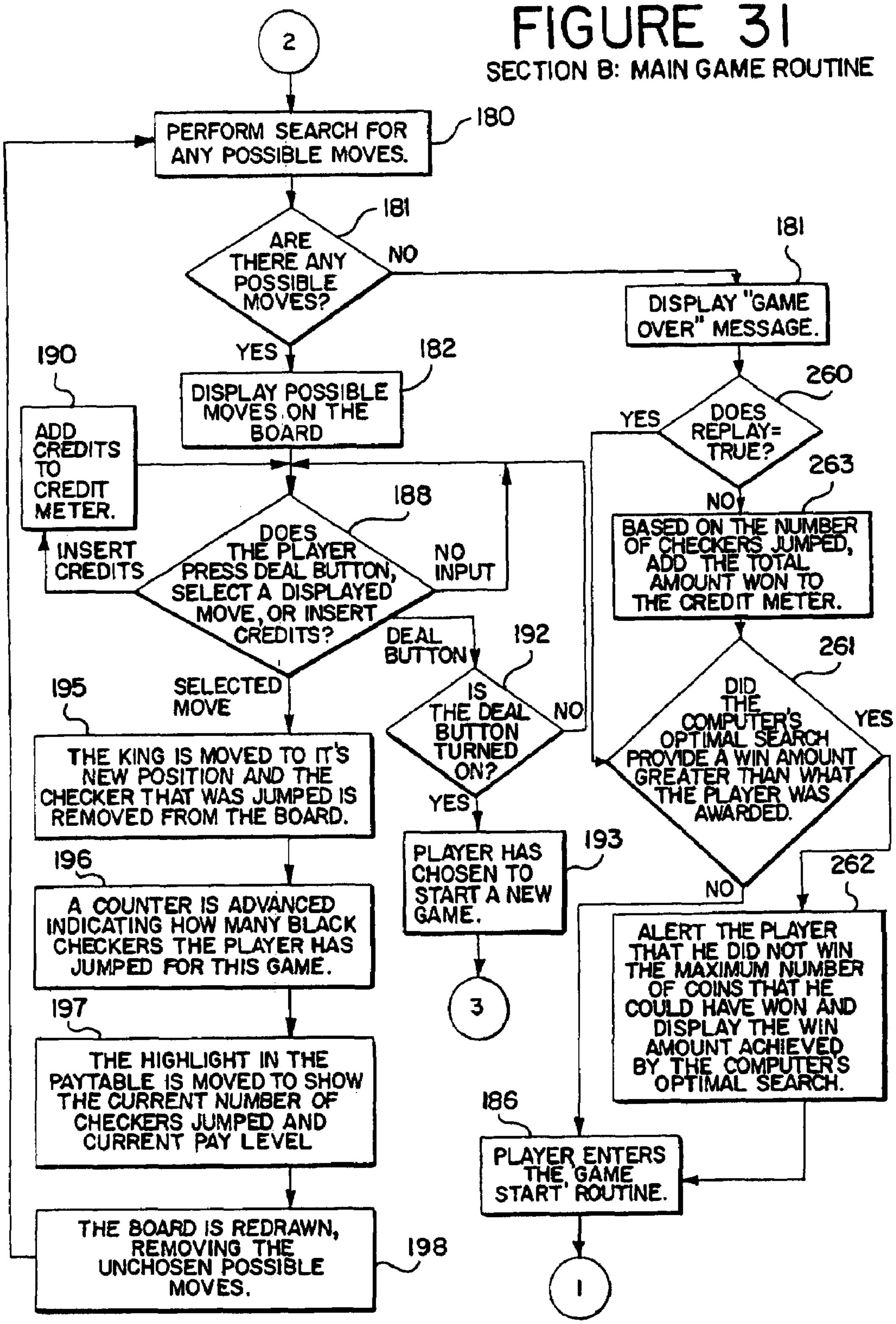

An embodiment having a teaching feature to educate the player on how to best play the foregoing Checkers game, for instance, is shown in the flow diagrams of FIGS. 30 and 31. In this example, there is no bonus round provided.

As seen at step 156 of FIG. 30, the teaching program adds a further loop at this point in the game. A replay feature, as actuated by a replay button for instance, is made available, beginning with a Replay=True setting at step 250. Player selection buttons are thereby disengaged at step 251, and all checkers are repositioned based upon the previous game play at step 252. The positions of the all checkers are then stored in memory for the replay feature at step 255.

The sequence previously described from the Deal Checkers button actuation is also altered, with a Replay=False setting initially engaged at step 256 before proceeding with steps 165 and 166. Step 255 is likewise followed for storing positions of the checkers in memory at this stage. The remainder of the steps for the start-up sequence are as previously described above.

If Replay is set to "True," then at step 260 the program skips the credit award step 263, because the player should not earn credits on a replayed board. Then, in either case, the program checks the player's results against optimum play at step 261.

Figure 32:
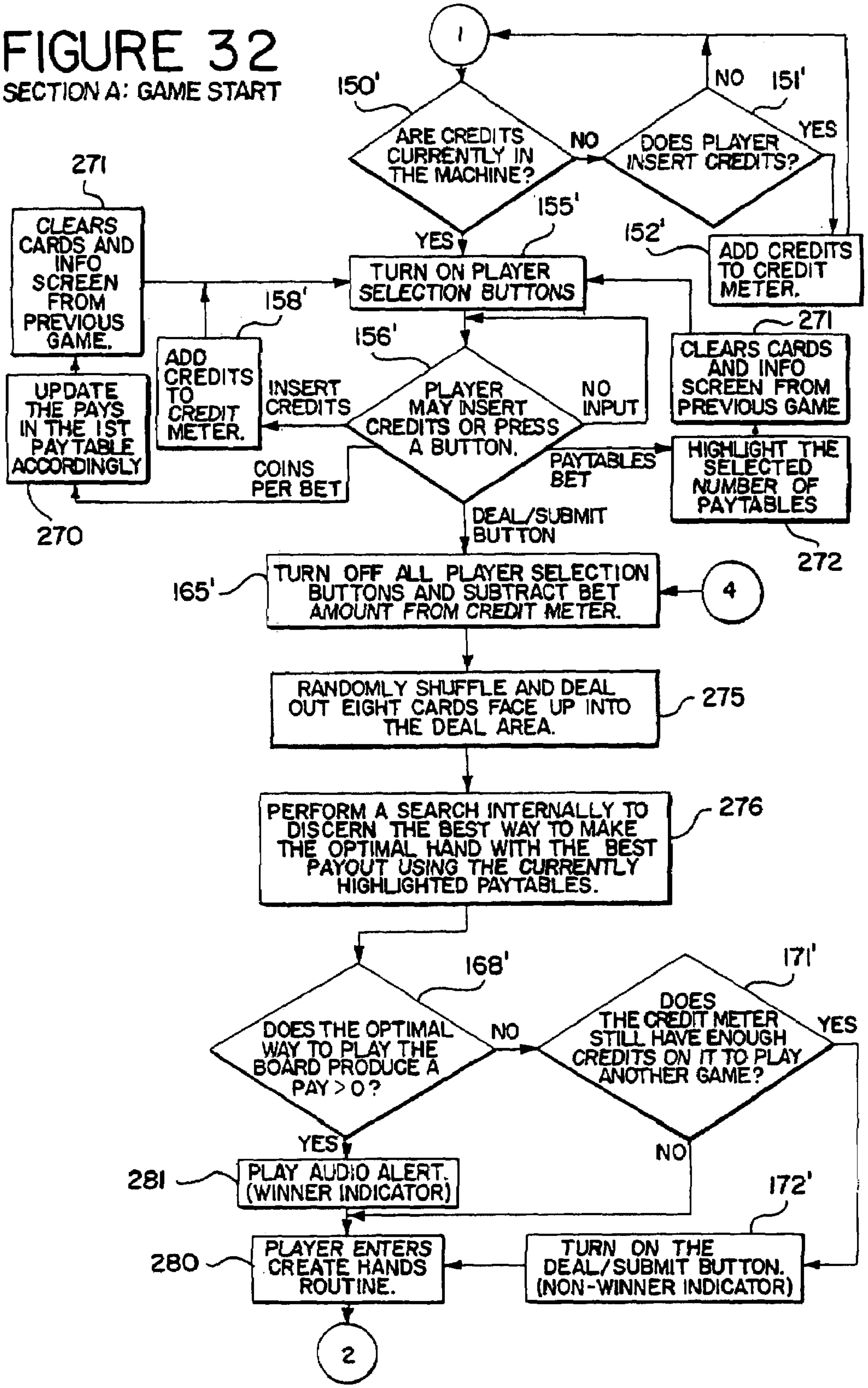
FIGS. 32 through 34 are diagrammatic flowcharts of a poker-type game program made in accordance with the present invention.
Figure 33:
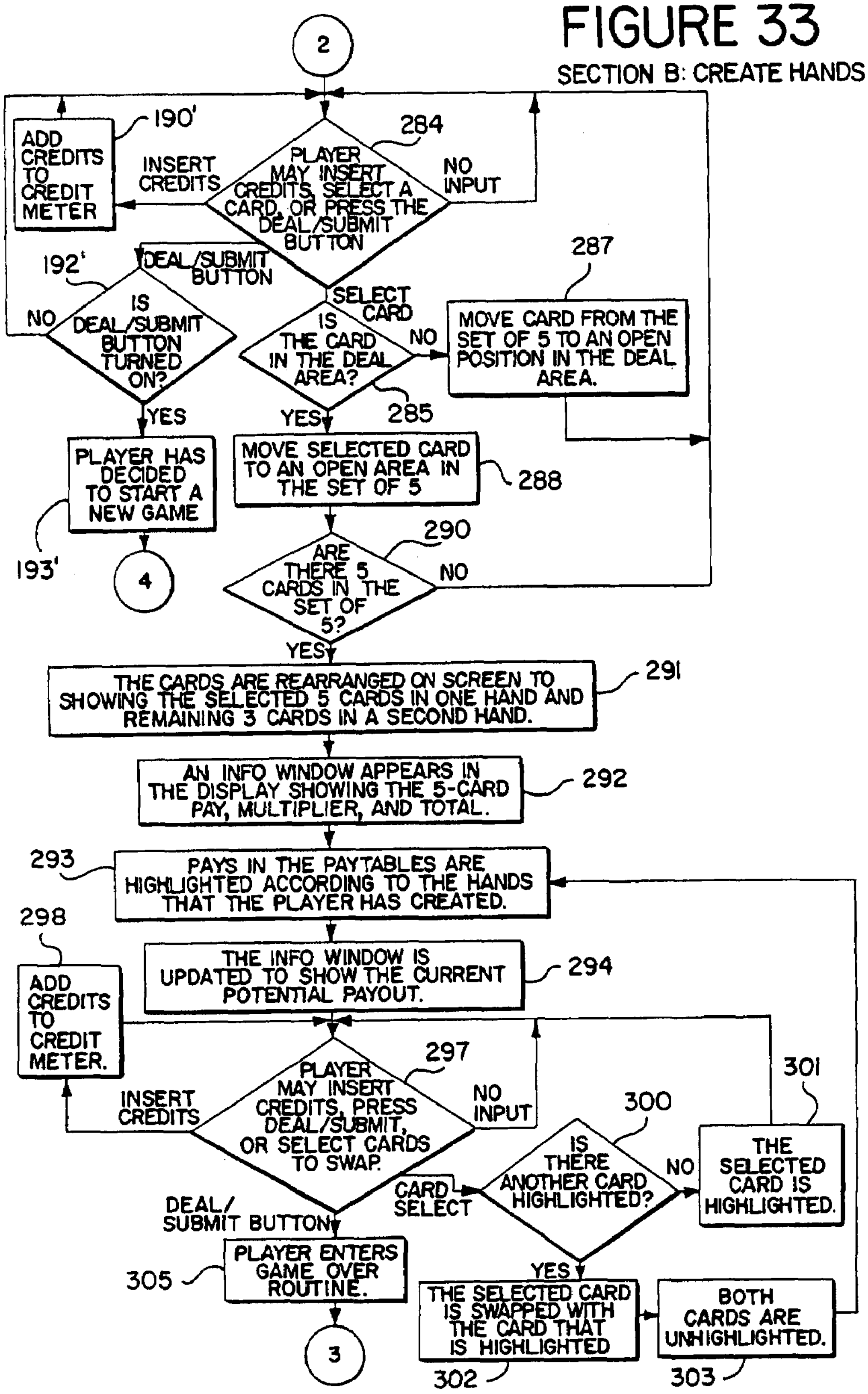
Figure 34:
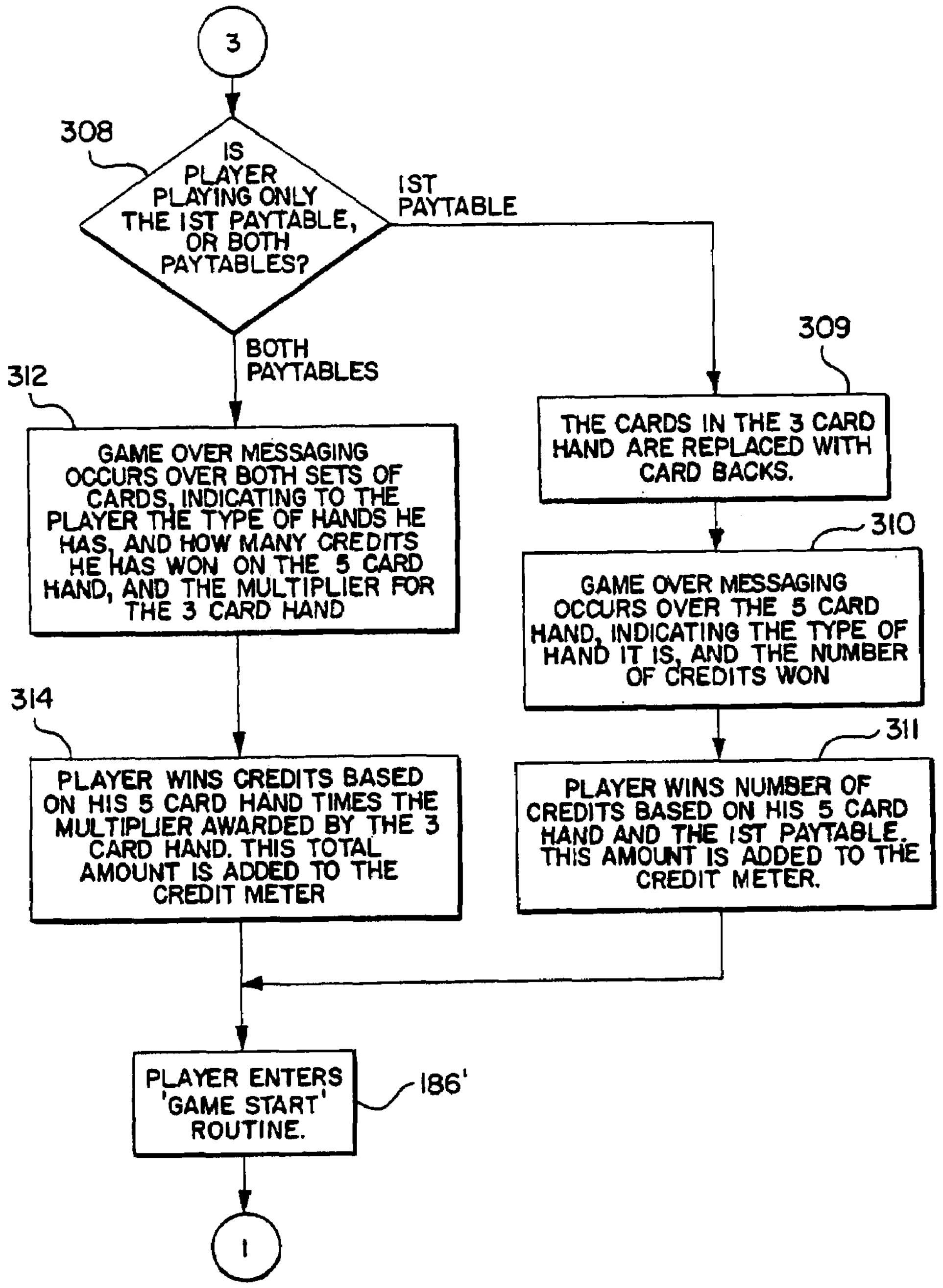

FIGS. 32 through 34 diagrammatically illustrate programming for a poker game described above and made in accordance with the invention. Also as previously noted, primed numbers refer to similar steps already discussed. Steps and sub-routines previously described in relation to the Checkers embodiments will not be restated for the poker embodiment, except as deemed appropriate for discussion of new or significantly changed steps.

Looking at FIG. 32, from step 156' the player now has a choice to select the coins to bet from button 107 (e.g., FIG. 16), which updates the first paytable based upon the selection at step 270. The initial game display screen is then cleared of any cards and other information presented from a previous game at step 271, looping back to step 155'. The player also has the option of choosing the number of paytables out of step 156', with the paytables being selected (one or two) highlighted at step 272 via selection using button 108, with screen-clearing of step 271 thereafter.

Play ultimately proceeds through actuation of the Deal/Submit button 111, and then to step 165'. At step 275, eight of the fifty-two cards in the "deck" are randomly selected by the program, and displayed in the spaces 105. The program then executes a search step 276 to determine the best way to make an optimal arrangement of the cards in view of the paytable(s) selected. If there is no way to produce a payout, see steps 168', 171' and 172' leading to the "Create Hands" (base or main game) sequence at step 280. If there is a payout presented at 168', then an audio cue is generated at step 281, proceeding to step 280.

At point 2 of FIG. 33, the main game sequence is entered. Decisional step 284 gives the player options of adding more credits (190'), selecting cards or pressing Deal/Submit button 111. The Deal/Submit loop follows steps 192', 193', with a possible transmit back to point 4 of FIG. 32 for a new game.

When cards are selected using the appropriate pointing or other device already described above, the program first checks at step 285 to determine if the card is in the Deal Area spaces 105. If it is not (i.e., it is in one of the selected card spaces 106), then it is moved to one of the open spaces 105 per step 287. The player then can loop back to step 284, as for another selection. If the selected card is in the spaces 105, then step 288 effects its movement to an open space 106 in the main hand. An evaluation step 290 is then made as to whether there are five cards selected (occupying all spaces 106). If not, then the player continues through step 284 et seq. If so, then the cards are rearranged on a new screen to show the five and three card hands at step 291 (e.g., FIG. 19). The informational window 115 is likewise generated at step 292, and step 293 highlights applicable pays in the paytable(s) based upon the selected cards. Note that the game then proceeds through an update step 294 to the window 115 (which may be applicable later in the operation of the program, as described below).

A decisional step 297 then permits the player to either insert more credits, swap cards between the two hands, or submit the hands. If credits are added at step 298, then the player is returned to step 297. Should the player elect to swap cards by selecting a card, then the program determines whether any card is highlighted at step 300. If not, then the card selected by the player is highlighted for swapping at step 301, with a return to step 297 for selection of another card via step 300. With one card now highlighted, the second selected card is then swapped with the first at step 302, both cards become unhighlighted (step 303), and step 293 is returned to for display of the value of the selected hands, including updating of window 115 at step 294.

Eventually, the player submits the hand using button 111 at step 305, and enters the end-of-game routine, which is illustrated in FIG. 34. The program at this stage ascertains whether one or both of the paytables 100, 101 are being played at step 308. If only paytable 100 is being played, then step 309 removes the three card hand (as by simply showing the "back" of the cards), with a "Game Over" message or the like appearing over the five card hand, an indication of type of hand, and credits won at step 310, with step 311 then adding the credits won to the credit grand total (meter). The game then returns to the start-up routine step 186'.

If both paytables are in play, then steps 312 and 314 are followed, leading to step 186'. This results in display of the "Game Over" message over both hands, and indication of the type and value of the hands, credits won and the multiplier from the three card hand, along with the total credits won being added to the credit grand total.

Figure 35:
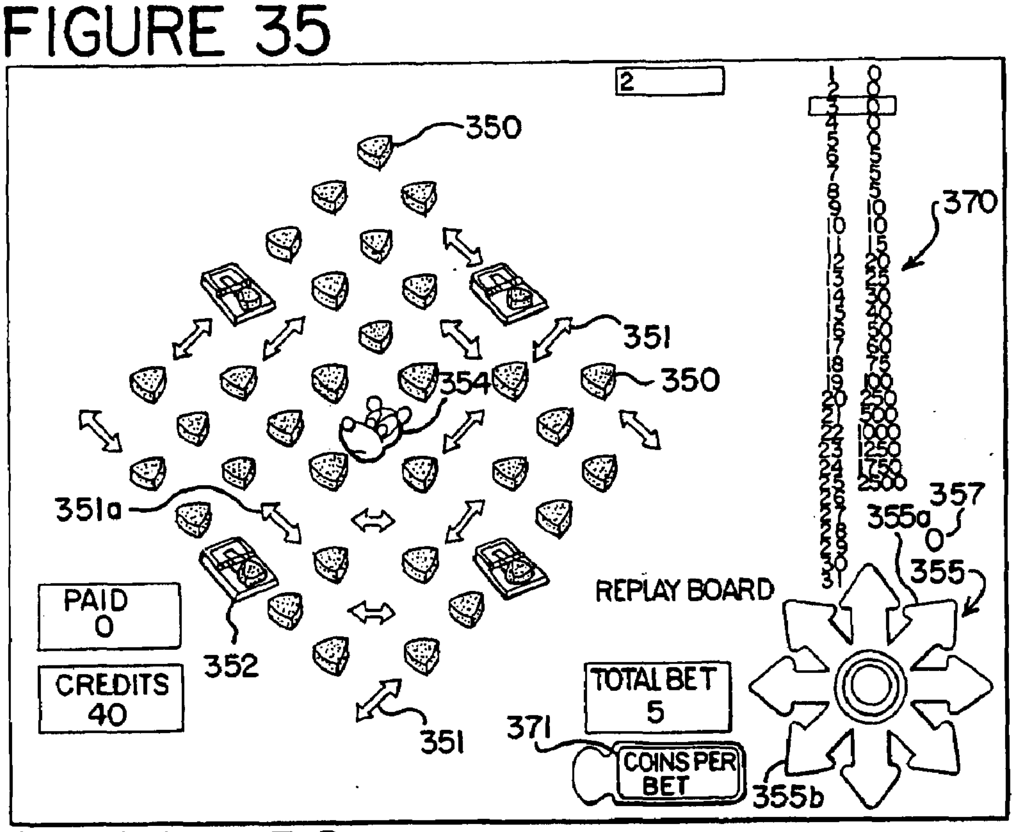
FIGS. 35 and 36 are two views of a display of another embodiment of the invention taking the form of a maze-type game.
Figure 36:
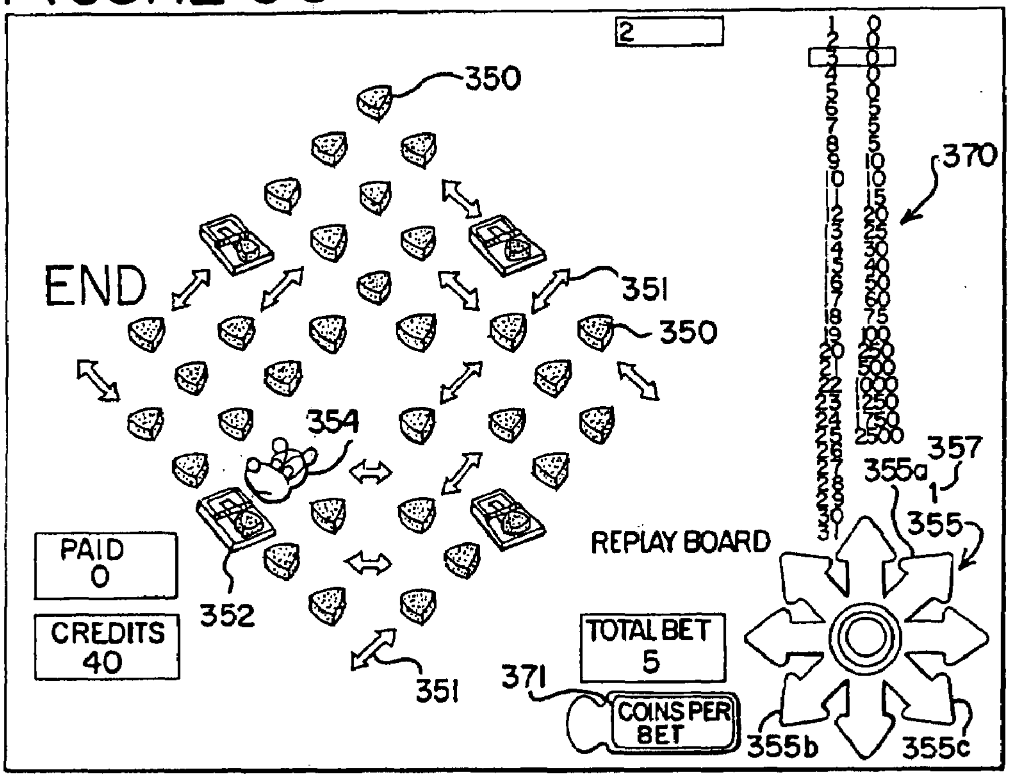

FIGS. 35 and 36 show yet another variation on the type of computerized game to which the present invention can be applied. In this instance, it is a maze-type game. This game combines full information with the cascading strategy of the invention. A board is generated by the program defined by pieces of cheese 350, directional arrows 351 and traps 352. These elements 350, 351 and 352 form an array of rows or lines.

The player moves the "mousehead" 354, with an initial direction dictated by the program as evidenced on a player movement selector 355. In this example, the selector 355 first allows movement only in the directions of arrows 355*a* and 355*b*. The mousehead 354 thereby proceeds under player choice in one of those two directions until it hits an arrow, trap or exits the maze.

FIG. 36 shows the mousehead having advanced along the direction of arrow 355*b*. One piece of cheese is collected, and is tallied by the game for display at 357. Having engaged directional arrow 351*a* (FIG. 35), the player now has the option of moving along movement selector arrows 355*c* or 355*d*. Movement along 355*d* will pick up more cheese, but will also result in leaving the maze (the "End" indicator being shown). An appropriate paytable 370 is provided based upon the amount of cheese collected. The usual player inputs for credits, coins per bet 371 and the like are advantageously provided, as desired. Play continues until a move results in contact with a trap or "End" indicator.

Figure 37:
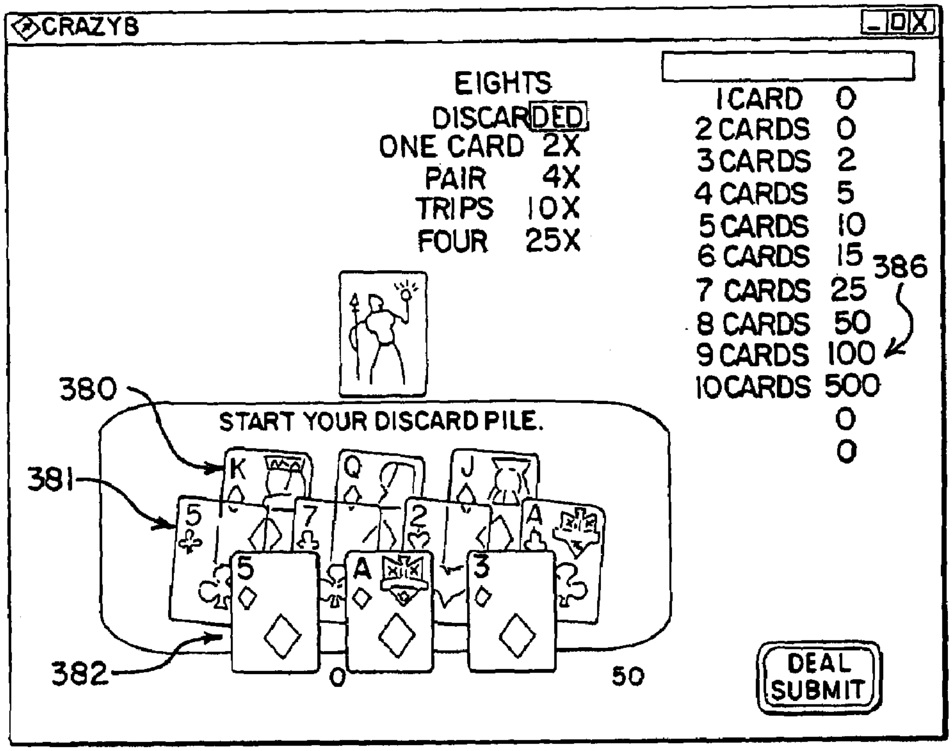
FIGS. 37 and 38 are two views of a display of yet another embodiment of the invention taking the form of a "Crazy Eights"-type card game.
Figure 38:
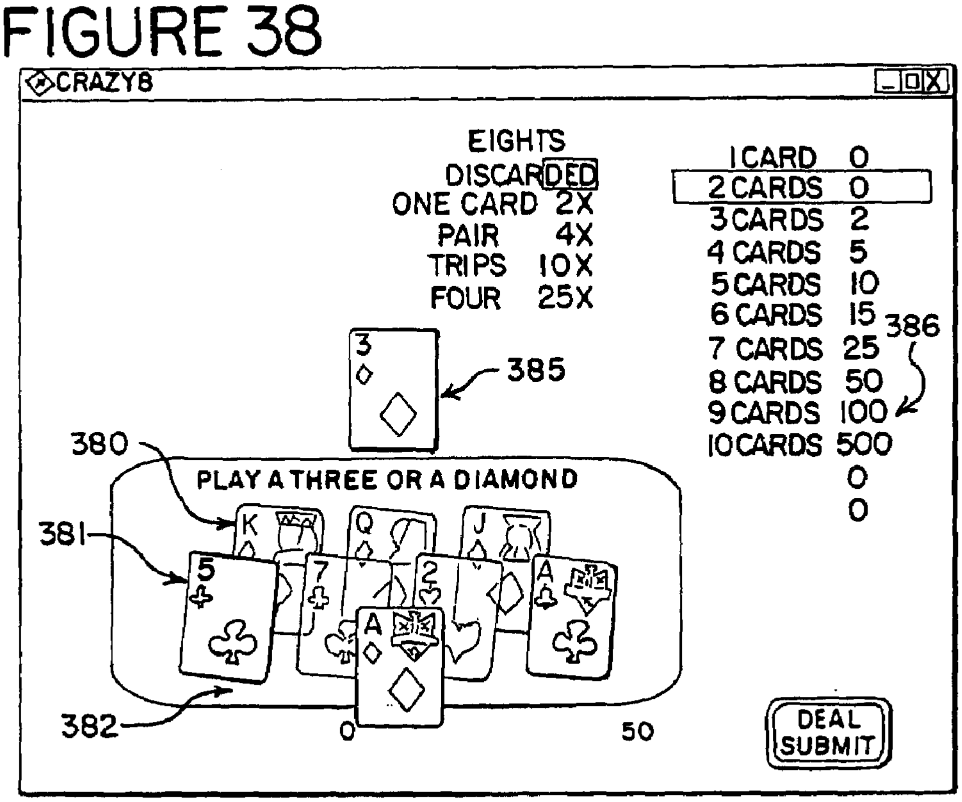

FIGS. 37 and 38 show yet another game made in accordance with the present invention, this one taking the form of a "Crazy Eights"-type card game. Here, ten cards are randomly selected in the usual manner from a "deck" of fifty-two. They are placed in three ascending or tiered rows of three (380), four (381) and three (382) cards. The topmost tier 382 is highlighted, while the rows below are initially subdued in presentation. The objective of the game is to remove cards from the first tier 382 to a discard pile 385, to thereby "free" (expose) underlying cards for similar removal, if possible. Only fully exposed cards may be played. Removal follows the traditional rules of the Crazy Eights format, which requires each play after the initial card to match suit or rank of the previous card played. A suitably structured payout table 386 is provided for the game, based upon the number of cards played. This may be multiplied as shown if one or more "eights" are played. Player inputs for credits, bet and card selection, etc., as previously discussed, and as desired, are provided. Once again, however, it will be noted that this game likewise provides the player with full information—all the cards to be played are visible—along with cascading strategy in view of the choices to be made in discard order.

Thus, while the invention has been disclosed and described with respect to certain embodiments, those of skill in the art will recognized modifications, changes, other applications and the like which will nonetheless fall within the spirit and ambit of the invention, and the following claims are intended to capture such variations.

What is claimed is:

1. A computerized checkers game for a gaming machine, comprising:

a cpu;

a visual display of a checkerboard;

a first set of at least one computer-generated player checker(s);

a second set of computer-generated game checkers;

a player input mechanism interfacing with said cpu responsive to player commands, said input mechanism including a wagering device responsive to player wagering input; and a computer program which (i) places said first set of player checker(s) on said visual display, (ii) places said second set of game checkers on said visual display, (iii) responds to player commands to effect movement of said player checker(s) on said display without movement of said game checkers thereafter in response to any player checker movement, including a capture jump movement relative to said game checkers, and (iv) provides an output based upon a wagering input and movement of said player checker(s).

2. The checkers game of claim 1 wherein said computer program further: (v) counts any said capture jump movement and produces a count result as a sum displayed on said visual display.

3. The checkers game of claim 2 wherein said computer program further: (vi) has a pre-determined payout tabulation, and a payout is generated from said payout table based upon said count result.

4. The checkers game of claim 1 wherein said computer program includes a random number generator which randomly places said game checkers on said board.

5. The checkers game of claim 4 wherein said player checker(s) are placed in a predetermined order on one side of said board.

6. The checkers game of claim 4 wherein said player checker(s) are placed in a random pattern on said board.

7. A method for operating a processor-controlled gaming machine comprising the steps of:

providing gameplay elements in a manner that can be visualized, with said gameplay elements having a specific nature which is revealed to the player at a beginning to the game, providing a means for inputting a wager placed by the player;

providing a mechanism enabling the player to manipulate said gameplay elements no more than an average of ten times toward a game outcome without any chance event being introduced to affect said manipulation; and calculating an output based upon said wager and said game outcome, wherein said gaming machine is for a checkers game, and said gameplay elements include a first set of game checkers and a second set of at least one player checkers, said method further including:

placing said game checkers on a checkerboard in a generally random manner at said game beginning; and wherein said player manipulates said player checker(s), wherein said player checkers are manipulated by a capture jump movement relative to said game checkers, further including the step of counting any said capture jump movement and producing a count result as a sum displayed on a visual display, wherein the gaming machine includes a program having a pre-determined payout tabulation, and a payout is generated from said payout table based upon said count result.

8. A computerized card game comprising:

a cpu;

a visual display of a card layout;

a set of computer-generated cards each having a value;

a subset of cards randomly selected from said set of cards;

a player input mechanism interfacing with said cpu responsive to player commands, said input mechanism including a wagering device responsive to player wagering input;

a computer program which (i) records input from said wagering device as a wager, (ii) places said subset of cards on said visual display such that said value of each card in said subset is revealed to the player at a beginning to and continuously throughout the game, (iii) responds to player commands to effect movement of said cards in said subset on said display to a final arrangement; and (iv) generates a payout based upon said wager and said final arrangement, and not based upon any chance event in the play of the game, other than said random selection of said subset of cards from said set of cards.

9. The computer game of claim 8 wherein said card game is a poker-type game and wherein said set of cards is a standard card deck, and said computer program further:

(iv) establishes a first and a second hand for said subset of cards;

wherein said player commands manipulate said subset of cards into said first and second hands.

10. The computer game of claim 9 wherein each of said first and second hands have a hierarchical value according to traditional poker protocol.

11. The computer game of claim 10 wherein said computer program further includes predetermined payout tables for each of said first and second hands, each payout table being based at least in part upon said hierarchical value.

12. The computer game of claim 9 wherein said first hand is comprised of five cards and said second hand is comprised of less than five cards.

13. The computer game of claim 12 wherein said payout tables are different, and said payout table associated with said second hand is a multiplier of value for values of said first hand as established by said payout table for said first hand.

14. The computerized checkers game of claim 1 wherein said computer program further provides a visual indication of any available move.

15. The computerized checkers game of claim 1 further including a bonus round.

16. The computerized checkers game of claim 15 wherein said bonus round is earned by a capture jump movement of a special game checker which is randomly provided in the game.

17. The computerized checkers game of claim 15 wherein said computer program generates said bonus round by: (a) providing a set of bonus checkers each having either a value indicia or an end-round indicium, with said value and end-round indicia being initially hidden from the player, (b) responding to player commands to select at least one said bonus checker, (c) revealing an indicium of said bonus checker selected by said player, (d) compiling any value indicia revealed, and (e) repeating steps (a) through (d) unless an end-round indicium is revealed.

18. The computerized checkers game of claim 17 wherein if no end-round indicium is revealed after a predetermined number of bonus checker selections, then said program generates a final bonus event wherein a plurality of final bonus checkers are displayed and are randomly removed until a single final bonus checker remains, said single final bonus checker having a value.

19. A computerized card game for a gaming machine, comprising:

a cpu;

a visual display of a card layout;

a set of computer-generated playing cards, each having a face among a plurality of different faces that relate together in accordance with a game-playing methodology;

a subset of computer-generated game cards randomly selected from said set of cards;

a player input mechanism interfacing with said cpu responsive to player commands, said input mechanism including a wagering device responsive to player wagering input; and a computer program which (i) records input from said wagering device as a wager, (ii) places said subset of game cards face-up to the player and remaining face-up throughout the game on said visual display as a first group and a second group, (iii) responds to player commands to effect movement of said cards between said groups on said display to a final arrangement, and (iv) provides an output based upon said wager and said final arrangement, and not based upon any chance event in the play of the game.

20. The computer game of claim 19 wherein said card game is a poker-type game and wherein said set of cards is a standard card deck, and said computer program further:

(v) establishes a first and a second hand for said subset of cards;

wherein said player commands manipulate said subset of cards into said first and second hands.

21. The computer game of claim 20 wherein each of said first and second hands have a hierarchical value according to traditional poker protocol.

22. The computer game of claim 21 wherein said computer program further includes predetermined payout tables for each of said first and second hands, each payout table being based at least in part upon said hierarchical value.

23. The computer game of claim 20 wherein said first hand is comprised of five cards and said second hand is comprised of less than five cards.

24. The computer game of claim 23 wherein said payout tables are different, and said payout table associated with said second hand is a multiplier of value for values of said first hand as established by said payout table for said first hand.

* * * * *